United States Patent
Jiang et al.

(10) Patent No.: US 11,570,617 B2
(45) Date of Patent: Jan. 31, 2023

(54) COMMUNICATION METHOD AND COMMUNICATIONS APPARATUS

(71) Applicant: Huawei Technologies Co., Ltd., Shenzhen (CN)

(72) Inventors: Ming Jiang, Shenzhen (CN); Wenjin Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

(21) Appl. No.: 17/129,479

(22) Filed: Dec. 21, 2020

(65) Prior Publication Data

US 2021/0112406 A1    Apr. 15, 2021

Related U.S. Application Data

(63) Continuation of application No. PCT/CN2019/094818, filed on Jul. 5, 2019.

(30) Foreign Application Priority Data

Aug. 9, 2018    (CN) .......................... 201810904425.3

(51) Int. Cl.
*H04W 12/033*    (2021.01)
*H04W 12/02*    (2009.01)
*H04W 12/45*    (2021.01)

(52) U.S. Cl.
CPC ......... *H04W 12/033* (2021.01); *H04W 12/02* (2013.01); *H04W 12/45* (2021.01)

(58) Field of Classification Search
CPC .............................. H04L 12/033; H04L 12/02
See application file for complete search history.

(56) References Cited

U.S. PATENT DOCUMENTS

2016/0142906 A1* 5/2016 Park ................... H04W 12/04
455/419
2021/0112406 A1* 4/2021 Jiang .................. H04W 12/02

FOREIGN PATENT DOCUMENTS

CN    107580324 A    1/2018
CN    107743307 A    2/2018
(Continued)

OTHER PUBLICATIONS

PCT International Preliminary Report on Patentability for International application No. PCT/CN2019/094818, 5 pages, dated Feb. 9, 2021. (Year: 2021).*

(Continued)

*Primary Examiner* — Ponnoreay Pich
(74) *Attorney, Agent, or Firm* — Leydig, Voit & Mayer, Ltd.

(57) ABSTRACT

A communication method and a communications apparatus are provided. The method includes: when receiving a first PDU session establishment request sent by a UE, encrypting, by an access and management network element (AMF), user information in the request, to obtain encrypted user information; and sending, by the AMF, a second PDU session establishment request to an SMF in response to the first PDU session establishment request, where the second PDU session establishment request carries the encrypted user information. In this manner, after the UE accesses a core network, an AMF entity may encrypt user information of the UE. The interaction information between NF entities, for example, the AMF entity and an SMF entity, carries the encrypted user information, which helps prevent user privacy leakage.

8 Claims, 15 Drawing Sheets

(56) References Cited

FOREIGN PATENT DOCUMENTS

| CN | 108370600 A | 8/2018 | | |
|---|---|---|---|---|
| EP | 2421293 A1 | 2/2012 | | |
| WO | 2018006017 A1 | 1/2018 | | |
| WO | WO-2018087696 A1 | * | 5/2018 | ......... H04L 12/4633 |

OTHER PUBLICATIONS

EPO Written Opinion for application EP 19 848 370, 4 pages, dated Dec. 7, 2021. (Year: 2021).*

Huawei, Hisilicon et al., "Protection of the communication between NFs," 3GPP TSG SA WG3 (Security) Meeting #89, Reno (US), S3-17xxxx revision of S3-17xabc, (S3-173261), total 2 pages, 3rd Generation Partnership Project, Valbonne, France (Nov. 27-Dec. 1, 2017).

"SUCI—readiness to protection schemes update in future," 3GPP TSG-SA WG3 Meeting #91, S3-181393, Belgrade (Serbia), Total 3 pages 3rd Generation Partnership Project, Valbonne, France (Apr. 16-20, 2018).

"3rd Generation Partnership Project; Technical Specification Group Services and System Aspects; Security architecture and procedures for 5G system (Release 15)," 3GPP TS 33.501 V15.1.0, pp. 1-152, 3rd Generation Partnership Project, Valbonne, France (Jun. 2018).

"TS 23.502: Modification of the Registration procedure for UE Identity Request," SA WG2 Meeting #S2-122, S2-174451, San Jose Del Cabo, Mexico, pp. 1-7, 3rd Generation Partnership Project, Valbonne, France (Jun. 26-30, 2017).

"Discussion on use case needing UDM selection based on individual SUPI," 3GPP CT4 Meeting #85-bis, C4-185240, Sophia-Antipolis, FR, Total 12 pages, 3rd Generation Partnership Project, Valbonne, France (Jul. 9-13, 2018).

"3rd Generation Partnership Project; Technical Specification Group Services and System Aspects; Procedures for the 5G System; Stage 2 (Release 15)," 3GPP TS 23.502 V15.2.0, pp. 1-308, 3rd Generation Partnership Project, Valbonne, France (Jun. 2018).

* cited by examiner

COMMUNICATION METHOD AND COMMUNICATIONS APPARATUS

CROSS-REFERENCE TO RELATED APPLICATIONS

This application is a continuation of International Application No. PCT/CN2019/094818, filed on Jul. 5, 2019, which claims priority to Chinese Patent Application No. 201810904425.3, filed on Aug. 9, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

In 5G networks, a mobile communications network serves not only individual consumers, but more importantly, different industries. For example, in various industries such as healthcare, smart appliances, and intelligent transportation, service data may be transferred to a 5G network platform, that is, a 5G core network. When user equipment (UE) needs to access service data, the user equipment may access a core network. For example, the UE may access the core network through various access technologies (AT), such as a 3rd Generation Partnership Project (3GPP) access technology, or a non-3GPP access technology. Regardless of which AT is used to access the core network, user information of the UE is directly carried in interaction information between network function (NF) entities on a core network side after the UE accesses the core network. Therefore, user information leakage of the UE may cause user privacy leakage.

SUMMARY

Embodiments of this application provide a communication method and a communications apparatus, to reduce a possibility of user information leakage in a process of information interaction between NF entities on a core network side.

According to a first aspect, an embodiment of this application provides a communication method. The method may be applied to a communications apparatus, for example, an access control and mobility management function (AMF) entity. The method includes: The AMF receives a first PDU session establishment request sent by a UE, where the first PDU session establishment request is used to request to establish a PDU session. The AMF encrypts user information of the UE to obtain encrypted user information. The AMF sends a second PDU session establishment request to a session management function (SMF), where the second PDU session establishment request carries the encrypted user information, the SMF is configured to invoke a user plane function (UPF) based on the second PDU session establishment request, and the UPF establishes the PDU session for the UE.

In the embodiment of this application, the AMF entity encrypts the user information of the UE to obtain the encrypted user information. Interaction information between the AMF entity and another NF entity (for example, the SMF entity) does not directly carry the user information, but carries the encrypted user information. In this manner, after the UE accesses a core network, interaction information between NF entities (for example, the AMF entity and the SMF entity) carries the encrypted user information, which helps prevent user privacy leakage.

In a possible design, the AMF receives a first decryption request sent by a UDM, where the first decryption request carries the encrypted user information; the AMF decrypts the encrypted user information to obtain the user information; and the AMF sends the user information to the UDM.

In a possible design, the AMF receives a second decryption request sent by a PCF, where the second decryption request carries the encrypted user information; the AMF decrypts the encrypted user information to obtain the user information; and the AMF sends the user information to the PCF.

In a possible design, the AMF receives a third decryption request sent by a CHF, where the third decryption request carries the encrypted user information; the AMF decrypts the encrypted user information to obtain the encrypted user information; and the AMF sends the user information to the CHF.

According to a second aspect, an embodiment of this application provides a communication method. The method may be applied to a communications apparatus, for example, a UDM entity. The method includes: The UDM receives a request that is sent by an SMF and that is used to obtain subscription information of UE, where the request carries encrypted user information of the UE. The UDM decrypts the encrypted user information to obtain user information. The UDM determines the subscription information of the UE based on the user information. The UDM sends the subscription information to the SMF.

In the embodiment of this application, when the UE accesses a core network, interaction information between the UDM and the SMF on the core network does not directly carry the user information, but carries the encrypted user information. Generally, the SMF is of high probability to be moved to an edge cloud. In this manner, the SMF may not directly contact with the user information, thereby helping prevent user privacy leakage.

In a possible design, that the UDM decrypts the encrypted user information to obtain user information includes: The UDM sends a first decryption request to the AMF, where the first decryption request is used to request to decrypt the encrypted user information; and the UDM receives the user information that is sent by the AMF and that is obtained through decryption performed on the encrypted user information.

In a possible design, that the UDM decrypts the encrypted user information to obtain user information includes: The UDM decrypts the encrypted user information through a key to obtain the user information.

In a possible design, the UDM receives a second decryption request sent by a PCF, where the second decryption request is used to request the decryption of the encrypted user information; the UDM decrypts the encrypted user information through the key to obtain the user information; and the UDM sends the user information to the PCF.

In a possible design, the UDM receives a third decryption request sent by a CHF, where the third decryption request is used to request to decrypt the encrypted user information; the UDM decrypts the encrypted user information through the key to obtain the user information; and the UDM sends the user information to the CHF.

According to a third aspect, an embodiment of this application provides a communication method applicable to a communications apparatus, for example, a PCF entity. The method includes: The PCF receives a request information sent by an SMF, where the request information is used to request for a session management policy of UE, and the request information carries encrypted user information of the UE. The PCF decrypts the encrypted user information to obtain user information. The PCF determines the session management policy of the UE based on the user information. The PCF sends the session management policy to the SMF.

In the embodiment of this application, when the UE accesses a core network, interaction information between the PCF and the SMF on the core network does not directly carry the user information, but the encrypted user information. Generally, the SMF is of high probability to be moved to an edge cloud. In this manner, the SMF may not directly contact with the user information, thereby helping prevent user privacy leakage.

In a possible design, that the PCF decrypts the encrypted user information to obtain user information includes: The PCF sends a decryption request to the AMF, where the decryption request is used to request to decrypt the encrypted user information; and the PCF receives the user information that is sent by the AMF and obtained through decryption performed on the encrypted user information.

In a possible design, that the PCF decrypts the encrypted user information to obtain user information includes: The PCF decrypts the encrypted user information through a key to obtain the user information.

In a possible design, that the PCF decrypts the encrypted user information to obtain user information includes: The PCF sends a decryption request to a UDM, where the decryption request is used to request to decrypt the encrypted user information; and the PCF receives the user information sent by the UDM, where the user information is obtained through decryption through a key that the UDM performed on the encrypted user information.

According to a fourth aspect, an embodiment of this application provides a communication method applicable to a communications apparatus, for example, a CHF entity. The method includes: The CHF receives a charging request sent by an SMF, where the charging request is used to request to perform charging for UE and the charging request carries encrypted user information of the UE. The CHF decrypts the encrypted user information to obtain user information. The CHF performs charging for the UE based on the user information.

In the embodiment of this application, when the UE accesses a core network, interaction information between the CHF and the SMF on the core network may not directly carry the user information, but the encrypted user information. Generally, the SMF is of high probability to be moved to an edge cloud. In this manner, the SMF may not directly contact with the user information, thereby helping prevent user privacy leakage.

In a possible design, that the CHF decrypts the encrypted user information to obtain user information includes: The CHF sends a decryption request to the AMF, where the decryption request is used to request to decrypt the encrypted user information; and the CHF receives the user information that is sent by the AMF and obtained through decryption performed on the encrypted user information.

In a possible design, that the CHF decrypts the encrypted user information to obtain user information includes: The CHF decrypts the encrypted user information through a key to obtain the user information.

In a possible design, that the CHF decrypts the encrypted user information to obtain user information includes: The CHF sends a decryption request to a UDM, where the decryption request is used to request to decrypt the encrypted user information; and the CHF receives the user information that is sent by the UDM, where the user information is obtained through decryption performed on the encrypted user information by the UDM through a key.

In a possible design, the user information includes one or more of a subscription permanent identifier SUPI, an international mobile subscriber identity IMSI, or a mobile station integrated services digital network number MSISDN.

According to a fifth aspect, a communications apparatus is provided. The communications apparatus may implement the functions of the AMF in the foregoing method designs. The functions may be implemented by hardware, or may be implemented by hardware executing corresponding software. The hardware or the software includes one or more units corresponding to the foregoing functions.

In a possible design, a structure of the communications apparatus may include a receiver, a processor, and a transmitter. The receiver, the processor and the transmitter may perform corresponding functions in the method according to the first aspect or any possible design of the first aspect.

According to a sixth aspect, a communications apparatus is provided. The communications apparatus has functions for implementing the UDM in the foregoing method designs. The functions may be implemented by hardware, or may be implemented by hardware executing corresponding software. The hardware or the software includes one or more units corresponding to the foregoing functions.

In a possible design, a structure of the communications apparatus may include a receiver, a processor, and a transmitter. The receiver, the processor and the transmitter may perform corresponding functions in the method according to the second aspect or any possible design of the second aspect.

According to a seventh aspect, a communications apparatus is provided. The communications apparatus has functions for implementing the PCF in the foregoing method designs. The functions may be implemented by hardware, or may be implemented by hardware executing corresponding software. The hardware or the software includes one or more units corresponding to the foregoing functions.

In a possible design, a structure of the communications apparatus may include a receiver, a processor, and a transmitter. The receiver, the processor and the transmitter may perform corresponding functions in the method according to the third aspect or any possible design of the third aspect.

According to an eighth aspect, a communications apparatus is provided. The communications apparatus has functions for implementing the CHF in the foregoing method designs. The functions may be implemented by hardware, or may be implemented by hardware executing corresponding software. The hardware or the software includes one or more units corresponding to the foregoing functions.

In a possible design, a structure of the communications apparatus may include a receiver and a processor. The receiver and the processor may perform corresponding functions in the method according to the fourth aspect or any possible design of the fourth aspect.

According to a ninth aspect, a communications apparatus is provided. The communications apparatus may be an AMF, or a function module such as a chip disposed in the AMF. The device includes: a memory, configured to store computer-executable program code; a transceiver; and a processor, where the processor is coupled to the memory and the transceiver. The program code stored in the memory includes an instruction, and when the processor executes the instruction, the instruction enables the communications apparatus to perform the method performed by the AMF according to the first aspect or any possible design of the first aspect.

According to a tenth aspect, a communications apparatus is provided. The communications apparatus may be a UDM, or a function module such as a chip disposed in the UDM. The device includes: a memory, configured to store computer-executable program code; a transceiver; and a processor, where the processor is coupled to the memory and the transceiver. The program code stored in the memory includes an instruction, and when the processor executes the instruction, the instruction enables the communications apparatus to perform the method performed by the UDM according to the second aspect or any possible design of the second aspect.

According to an eleventh aspect, a communications apparatus is provided. The communications apparatus may be a PCF, or a function module such as a chip disposed in the PCF. The device includes: a memory, configured to store computer-executable program code; a transceiver; and a processor, where the processor is coupled to the memory and the transceiver. The program code stored in the memory includes an instruction, and when the processor executes the instruction, the instruction enables the communications apparatus to perform the method performed by the PCF according to the third aspect or any possible design of the third aspect.

According to a twelfth aspect, a communications apparatus is provided. The communications apparatus may be a CHF, or a function module such as a chip disposed in the CHF. The device includes: a memory, configured to store computer-executable program code; a transceiver; and a processor, where the processor is coupled to the memory and the transceiver. The program code stored in the memory includes an instruction, and when the processor executes the instruction, the instruction enables the communications apparatus to perform the method performed by the CHF according to the fourth aspect or any possible design of the fourth aspect.

According to a thirteenth aspect, an embodiment of this application further provides a computer readable storage medium. The computer readable storage medium includes a computer program, and when the computer program runs on an AMF, the AMF is enabled to perform the method according to any one of the first aspect or the possible designs of the first aspect.

According to a fourteenth aspect, an embodiment of this application further provides a computer readable storage medium. The computer readable storage medium includes a computer program, and when the computer program runs on a UDM, the UDM is enabled to perform the method according to any one of the second aspect or the possible designs of the second aspect.

According to a fifteenth aspect, an embodiment of this application further provides a computer readable storage medium. The computer readable storage medium includes a computer program, and when the computer program runs on a PCF, the PCF is enabled to perform the method according to any one of the third aspect or the possible designs of the third aspect.

According to a sixteenth aspect, an embodiment of this application further provides a computer readable storage medium. The computer readable storage medium includes a computer program, and when the computer program runs on a CHF, the CHF is enabled to perform the method according to any one of the fourth aspect or the possible designs of the fourth aspect.

According to a seventeenth aspect, an embodiment of this application further provides a computer program product, where when the computer program product runs on an AMF, the AMF is enabled to perform the method according to any one of the first aspect or the possible designs of the first aspect.

According to an eighteenth aspect, an embodiment of this application further provides a computer program product, where when the computer program product runs on a UDM, the UDM is enabled to perform the method according to any one of the second aspect or the possible designs of the second aspect.

According to a nineteenth aspect, an embodiment of this application further provides a computer program product, where when the computer program product runs on a PCF, the PCF is enabled to perform the method according to any one of the third aspect or the possible designs of the third aspect.

According to a twentieth aspect, an embodiment of this application further provides a computer program product, where when the computer program product runs on a CHF, the CHF is enabled to perform the method according to any one of the fourth aspect or the possible designs of the fourth aspect.

BRIEF DESCRIPTION OF DRAWINGS

FIG. 5B-1, FIG. 5B-2, and FIG. 5B-3 are a schematic flowchart of a communication method according to an embodiment of this application;

FIG. 6B-1, FIG. 6B-2, and FIG. 6B-3 are a schematic flowchart of a communication method according to an embodiment of this application;

FIG. 7B-1, FIG. 7B-2, and FIG. 7B-3 are a schematic flowchart of a communication method according to an embodiment of this application;

DESCRIPTION OF EMBODIMENTS

Figure 1:
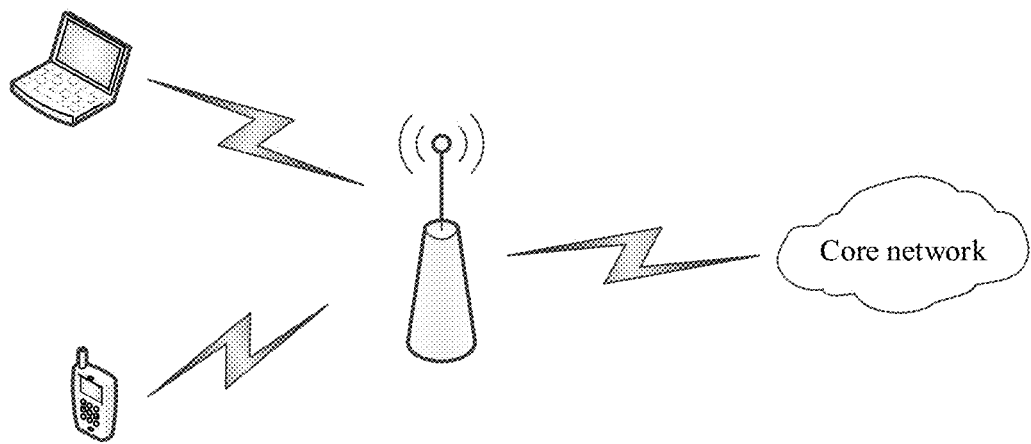
FIG. 1 is a schematic diagram of an application scenario according to an embodiment of this application.

The following describes the technical solutions in the embodiments of this application with reference to the accompanying drawings in the embodiments of this application.

The following describes some terms in the embodiments of this application to facilitate understanding of a person skilled in the art.

The user equipment UE in the embodiments of this application may be a wireless terminal device, or may be a wired terminal device. The wireless terminal device may be a device that provides voice and/or other service data connectivity for a user, a handheld device with a wireless connection function, or another processing device connected to a wireless modem. The wireless terminal device may communicate with one or more core networks through a radio access network (RAN). The wireless terminal device may be a mobile terminal, such as a mobile phone (also referred to as a "cellular" phone) and a computer with a mobile terminal, for example, may be a portable, pocket-sized, handheld, computer built-in, wearable, or vehicle-mounted mobile apparatus, which exchanges voice and/or data with the radio access network. For example, the terminal device may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, a user device.

A radio access network RAN in the embodiments of this application may implement functions such as wireless physical layer functions, resource scheduling, wireless resource management, radio access control, and mobility management functions. For example, the RAN refers to a base station that communicates with the wireless terminal device over an air interface by using one or more sectors in an access network. The base station may be configured to mutually convert a received over-the-air frame and an IP packet, and serve as a router between the terminal device and a remaining part of the access network, where the remaining part of the access network may include an IP network. The base station may further coordinate attribute management of the air interface. For example, the base station may include an evolved NodeB (nodeB, eNB, or e-NodeB, evolutional node B) in a long term evolution (LTE) system or an evolved LTE system (LTE-A), or may include a next generation Node B (gNB) in a 5G system. This is not limited in the embodiments of the present invention.

A core network designed in the embodiments of this application includes a plurality of NF entities, for example, an access control and mobility management function (AMF) entity (hereinafter referred to as an AMF entity), a session management function (SMF) entity (hereinafter referred to as an SMF entity), a policy control function (PCF) entity (hereinafter referred to as a PCF entity), a user plane function (UPF) entity (hereinafter referred to as a UPF entity), a data network (DN) entity (hereinafter referred to as a DN entity), an authentication server function (AUSF) entity (hereinafter referred to as an AUSF entity), and a user data management (UDM) entity (hereinafter referred to as a UDM entity). Certainly, the core network side further includes other NF entities. The foregoing several types are merely examples. This is not limited in the embodiments of this application.

Specifically, functions of the NF entities are as follows:

The AMF entity is mainly responsible for functions such as registration and authentication management of the UE, connection cable management and mobility management of the UE, network slice selection, and SMF entity selection.

The AMF entity may establish a control plane signaling connection with the RAN, to implement functions such as radio access bearer control.

The SMF entity is connected to the AMF entity (for example, connected through an N11 interface), and is mainly responsible for all control plane functions of UE session management, including UPF entity selection and UDM entity selection. The SMF entity is further responsible for obtaining a session management policy of the UE from the PCF entity.

The UDM entity is connected to the SMF entity (for example, connected through an N10 interface), and is configured to register a PDU session context for the UE, and store a subscription context of the UE. The UDM entity is further connected to the AUSF entity (for example, connected through an N13 interface). When the UDM entity is invoked by the AUSF entity, the UDM entity sends a user authentication set of the UE to the AUSF entity, and the AUSF entity performs authentication on the UE.

The AUSF entity is connected to the AMF entity (for example, connected through an N12 interface), and is configured to obtain a security authentication vector. The security authentication vector is used to perform security authentication between the UE and the network.

The PCF entity is connected to the SMF entity (for example, connected through an N7 interface), and is configured to obtain the session management policy of the UE, and provide the session management policy of the UE to the SMF entity.

The CHF entity is connected to the SMF entity, and is responsible for a charging function of the UE, which supports an offline charging function of the user, an online charging function of the user, and the like.

The UPF entity is connected to the SMF entity (for example, connected through an N4 interface), and is responsible for packet filtering, data transmission/forwarding, rate control, and the like, of a data packet of the UE.

The DN entity is connected to the UPF entity (for example, connected through an N6 interface), and is configured to store service data. The DN entity is further configured to receive uplink data sent by the UE, generate downlink data to be sent to the UE based on the uplink data, and send the downlink data to the UE.

A user data record (UDR) entity, in a 5G network architecture, may be configured to store data of a UDM entity and a PCF entity. For example, the UDR may be configured to store the subscription information and the session management policy. The UDR entity may be connected to the UDM entity and the PCF entity, respectively. The UDM entity may obtain the subscription information from the UDR, and the PCF entity may obtain the session management policy from the UDR. The subscription information may include the information about the service subscribed by the UE, and the like. The session management policy may include the information about the package subscribed by the UE, and the like.

In the embodiments of this application, the subscription information or the session management information may alternatively have another name. For example, the session management policy may alternatively be referred to as policy information. This is not limited in the embodiments of this application.

It should be understood that each NF entity shown in the foregoing figure may be physically a single device, or two or more entities may be integrated into a same physical device. This is not specifically limited in the embodiments of the present invention. It should be understood that a name of the "entity" is not limited in the embodiments of this application, and the "entity" may alternatively have another name, for example, a "network element", a "network element device", a "gateway", or a "gateway device".

It should be noted that some English abbreviations in the embodiments of this application are used to describe the embodiments of the present invention by using an LTE system and a current 5G network system as examples, and the English abbreviations may change with network evolution. For specific evolution, refer to descriptions in a corresponding standard.

In addition, the term "and/or" in this specification describes only an association relationship for describing associated objects and represents that three relationships may exist. For example, A and/or B may represent the following three cases: only A exists, both A and B exist, and only B exists. In addition, the character "/" in this specification usually indicates an "or" relationship between the associated objects.

FIG. 1 is a schematic diagram of an application scenario according to an embodiment of this application. As shown in FIG. 1, an example in which UE includes a smartphone and a convenient computer, and a RAN is a base station is used. An enterprise engaged in medical and health care is used as an example. The enterprise may store service data in a core network. When the UE needs to access the service data of the enterprise, the UE enters the core network through the base station, and obtains the service data from the core network.

Figure 2:
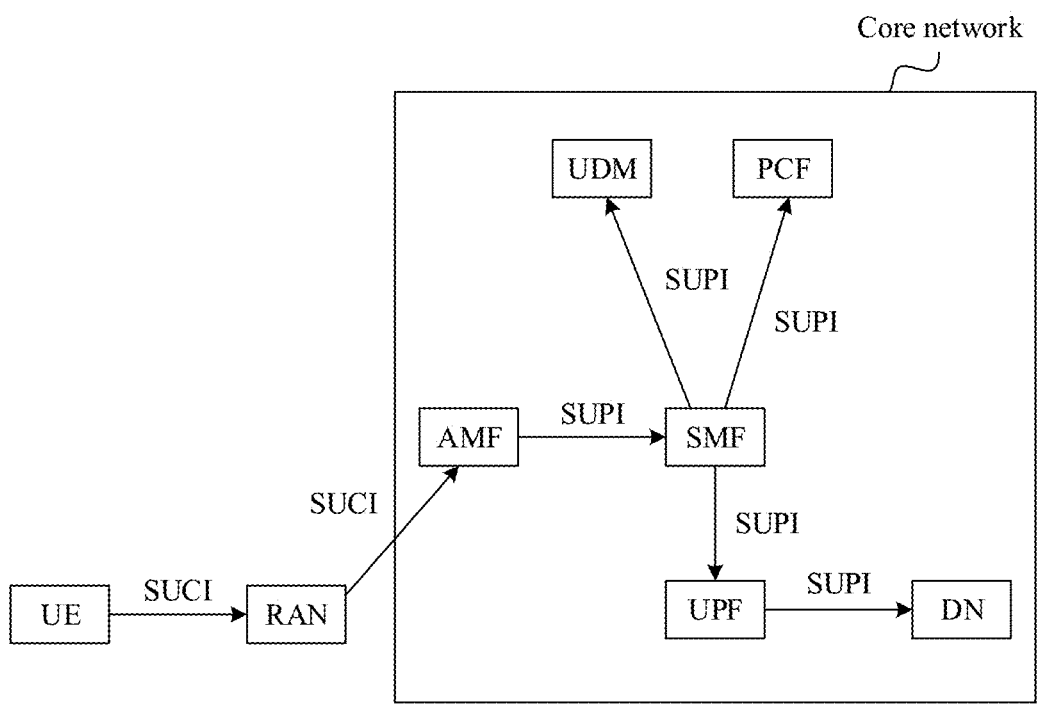
FIG. 2 is a schematic diagram of information interaction between various NFs in a core network in the prior art.

It can be learned from the foregoing that the core network includes a plurality of NF entities. In a 5G network architecture, after the UE accesses the core network, interaction information between NF entities on a core network side carries user information of the UE. Consequently, user information is prone to leakage. That UE establishes a PDU session is used as an example. FIG. 2 is a schematic diagram of a process in which the UE establishes the PDU session in the prior art. As shown in FIG. 2, the UE sends a PDU session establishment request to a RAN, where the PDU session establishment request carries a subscription concealed identifier (SUCI). It should be noted that the SUCI is obtained through encryption that the UE performed on a subscription permanent identifier (SUPI) of the UE through a key. The SUPI may be used to indicate user information of the UE.

The RAN sends the PDU session establishment request to an AMF entity. The AMF entity obtains the SUPI based on the SUCI (for example, the AMF may invoke a UDM, and the UDM decrypts the SUCI to obtain the SUPI). Next, the AMF entity sends, to an SMF entity, request information for establishing a PDU session context, where the request information carries the SUPI. Then, the SMF entity sends, to the UDM entity, request information for registering the PDU session context, where the request information carries the SUPI. In addition, the SMF entity sends, to a PCF entity, request information for obtaining a session management policy, where the request information also carries the SUPI. It can be learned that, in the prior art, after the UE accesses a core network, interaction information between NF entities (for example, between the SMF entity and the UDM entity, and between the SMF entity and the PCF entity) on the core network directly carries the SUPI. Because the SUPI is used to indicate the user information of the UE, the user information of the UE is prone to leakage.

An embodiment of this application provides a communication method. In the method, interaction information between NF entities on a core network carries encrypted user information, to prevent user privacy leakage. The method may be applicable to the application scenario shown in FIG. 1, and certainly may further be applicable to another application scenario. The following describes another two application scenarios.

Figure 3:
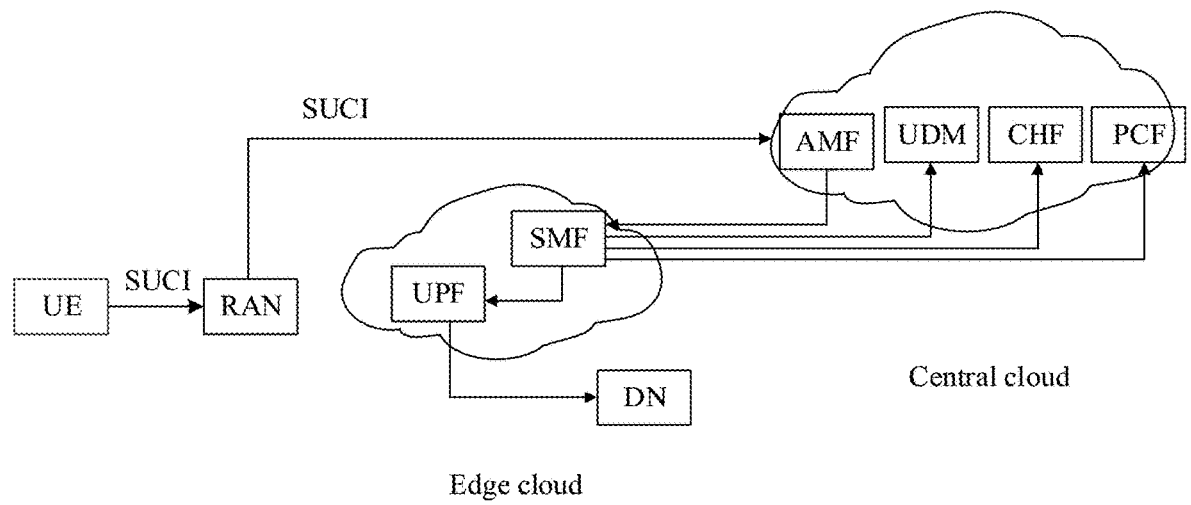
FIG. 3 is a schematic diagram of another application scenario according to an embodiment of this application.

Application Scenario 1:

In a 5G network architecture, location of each NF entity on the core network may be different. Therefore, the core network includes an edge cloud and a central cloud. Some NF entities are deployed on the edge cloud, and some NF entities are deployed on the central cloud. For example, an SMF entity and/or a UPF entity may be moved downstream to the edge cloud near a base station, to shorten a data route, reduce transmission costs and a service latency, and the like. FIG. 3 is a schematic diagram of an instance of another application scenario according to an embodiment of this application. In FIG. 3, the SMF entity and the UPF entity are moved downstream to the edge cloud near the base station. The enterprise engaged in medical and health care is again used as an example. The enterprise may store service data in a DN entity on the core network. When UE of a user needs to access the service data of the enterprise, the UE accesses the core network through the base station, and obtains the service data in the DN entity through NF entities on the edge cloud and the central cloud.

Generally, an NF entity deployed on the edge cloud is prone to security risks. For example, the NF entity deployed on the edge cloud is easily attacked and controlled by a hacker due to limited hardware resources and unattended operation. Therefore, if interaction information between NF entities (especially the NF entity deployed on the edge cloud) on the core network still directly carries user information, user privacy leakage easily occur.

Certainly, in FIG. 3, an example in which the SMF entity and the UPF entity being moved downstream to the edge cloud near the base station is only used. In an actual operation process, another NF entity in the core network may also be moved downstream to the edge cloud. Regardless of which NF entity is moved downstream to the edge cloud, the communication method provided in the embodiments of this application may be used to reduce a possibility of user privacy leakage in a process of information interaction between NF entities on the core network.

It should be noted that, in the application scenario shown in FIG. 1, a deployment location of each NF entity on the core network is not concerned (for example, all NF entities may be deployed on the central cloud). In the application scenario shown in FIG. 3, the deployment location of each NF entity may be different. The communication methods provided in the embodiments of this application are applicable to both the application scenario shown in FIG. 1 and FIG. 3. Certainly, the communication method provided in the embodiments of this application is further applicable to another scenario in which the interaction information between NF entities on the core network does not directly carry user information, for example, the following application scenario 2.

Figure 4:
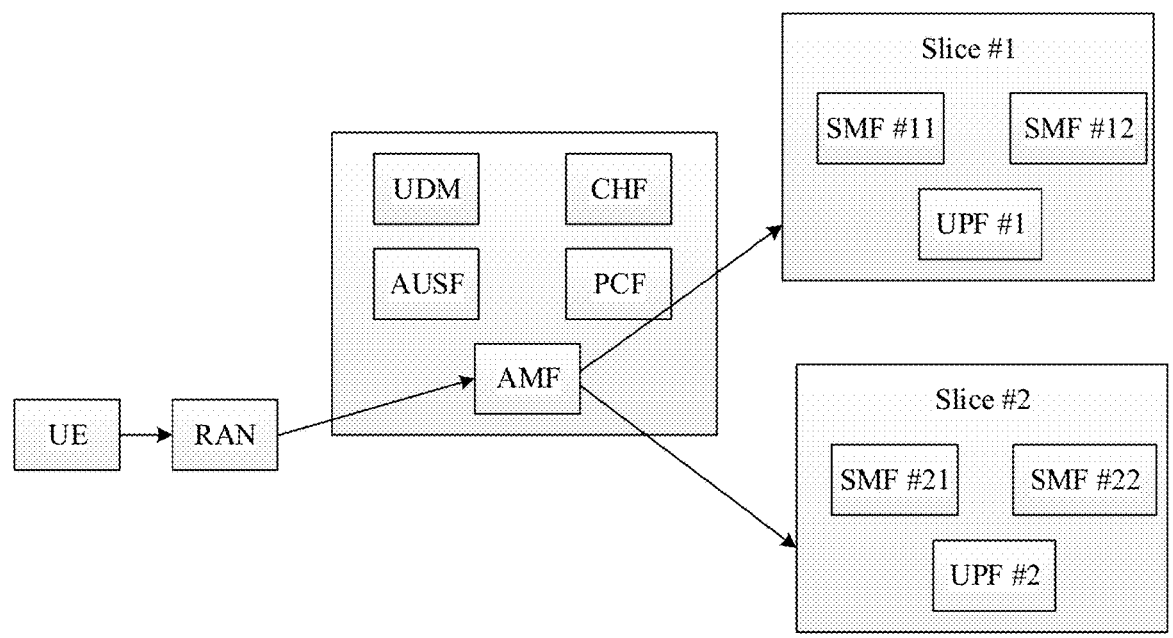
FIG. 4 is a schematic diagram of still another application scenario according to an embodiment of this application.

Application Scenario 2:

FIG. 4 is a schematic diagram of another application scenario according to an embodiment of this application. In the application scenario shown in FIG. 4, the core network includes two network slices, namely, a slice #1 and a slice #2. Each network slice has different function characteristics and is intended for different requirements and services. The UE may access different network slices based on different requirements. Each network slice includes an independent NF entity. An SMF entity and a UPF entity are used as examples. Each network slice has a corresponding SMF entity and UPF entity. For example, the slice #1 includes an SMF #11, an SMF #12, and a UPF #1. The slice #2 includes an SMF #21, an SMF #22, and a UPF #2. Because functions implemented by each network slice are different, an SMF entity and a UPF entity in a network slice may be out of a security trust scope of an operator. For example, the SMF #11, the SMF #12, and the UPF #1 included in the slice #1 are out of the security trust scope of the operator. In this case, when the UE accesses the slice #1, if interaction information between the SMF entity and the UPF entity in the slice #1 still directly carries user information, user privacy leakage may occur. Therefore, the communication method provided in the embodiments of this application may be applicable to all network slices, including a network slice in which an NF entity is out of the security trust range of the operator. Certainly, the communication method provided in the embodiments of this application may further be applicable to some NF entities in a network slice. For example, the communication method provided in the embodiments of this application is applicable only to an NF entity that is in a network slice but out of the security trust range of the operator (in other words, interaction information received or sent by the NF entity does not directly carry user information, but carries encrypted user information). For another NF entity (an NF entity other than the NF entity out of the security trust range of the operator) in the network slice, information interaction may be performed in a manner provided in the prior art (in other words, interaction information may directly carry user information). In any case, the communication method provided in the embodiments of this application reduces a possibility of user privacy leakage in a process of information interaction between NF entities on the core network.

Certainly, the communication method provided in the embodiments of this application may further be applicable to another application scenario. The foregoing application scenarios are merely examples. This is not limited in the embodiments of this application.

Figure 5A:
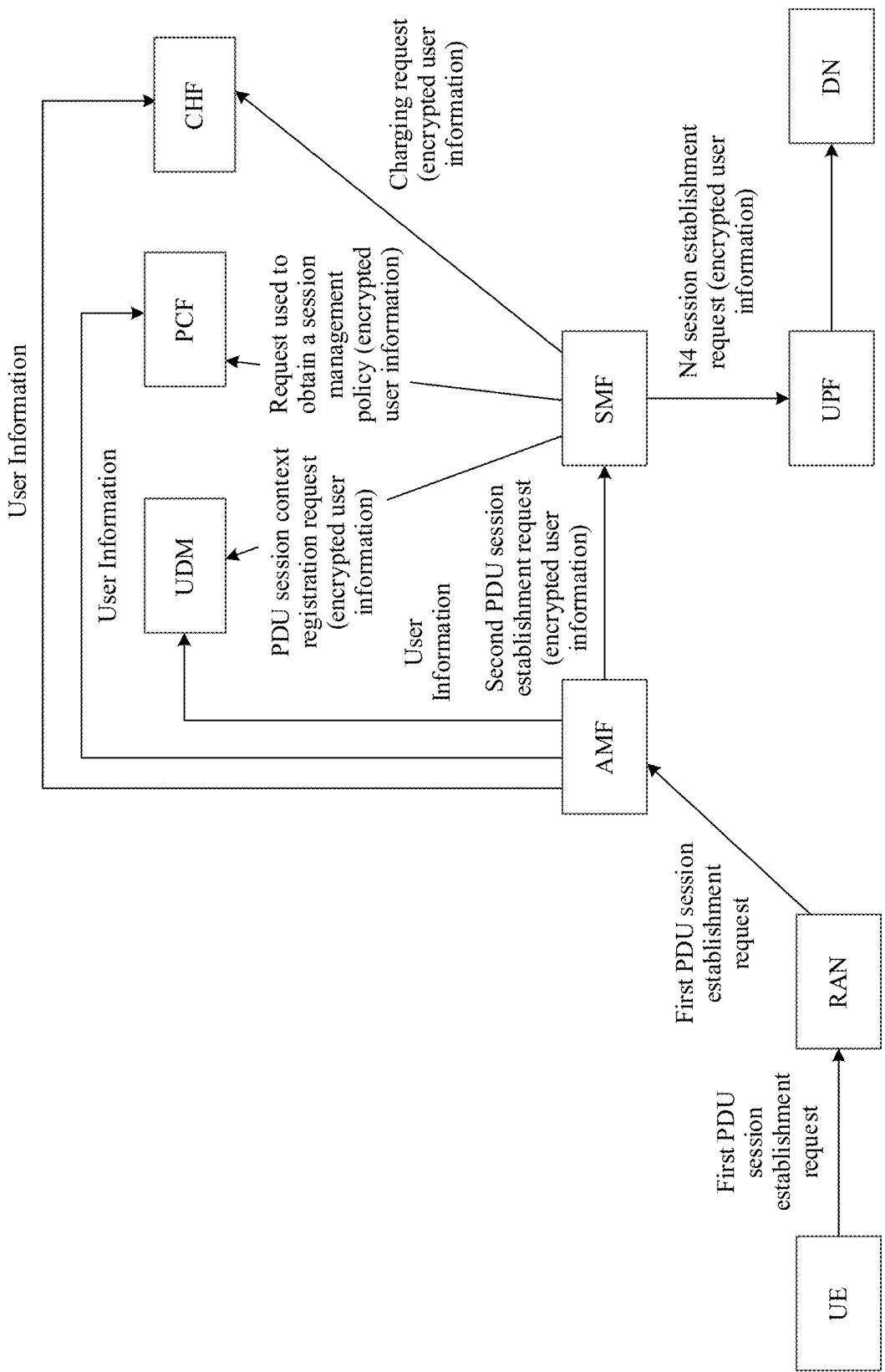
FIG. 5A is a schematic diagram of an application scenario in which a PDU session is established according to an embodiment of this application.
Figures 1, 5B:
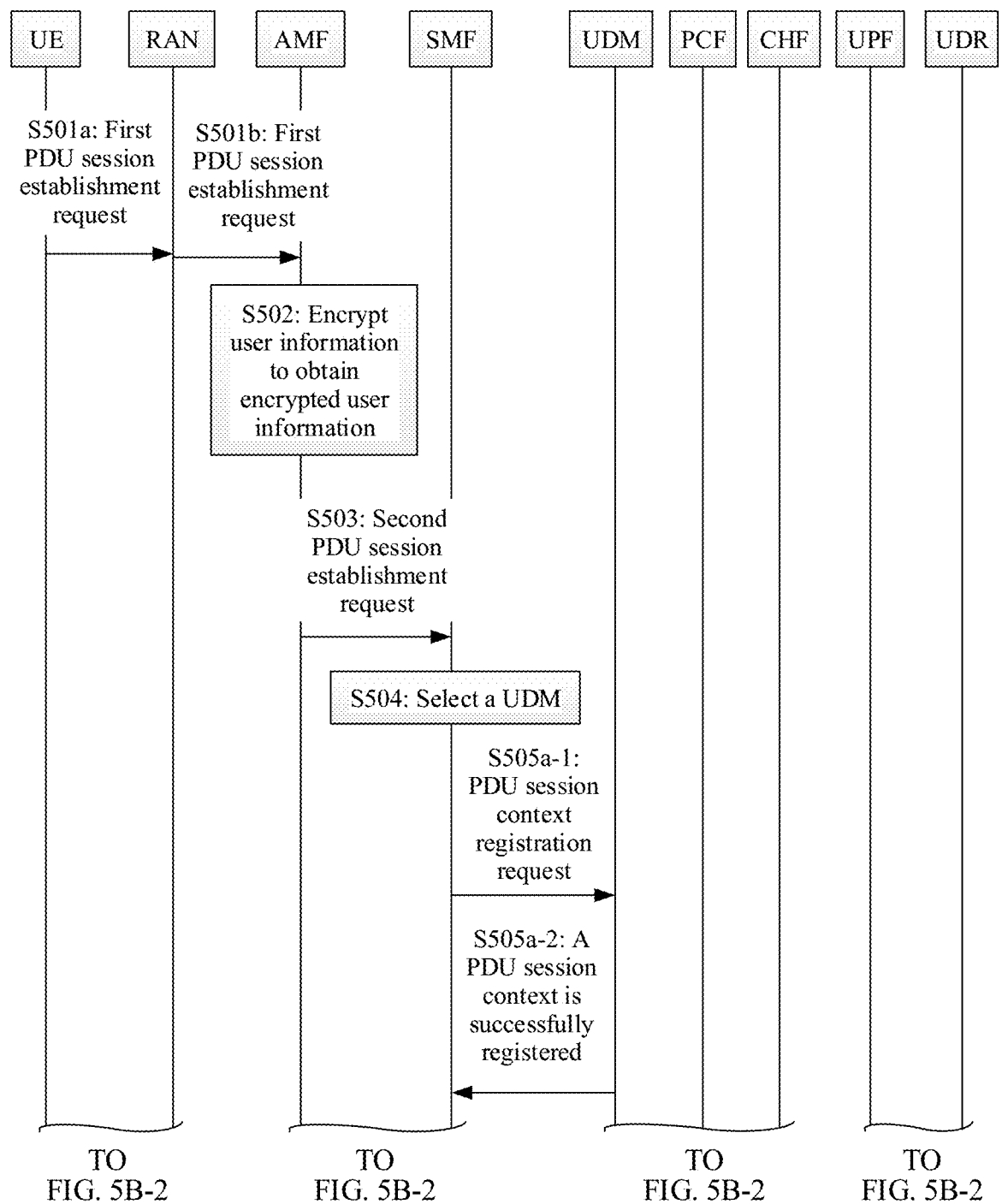
Figures 2, 5B:
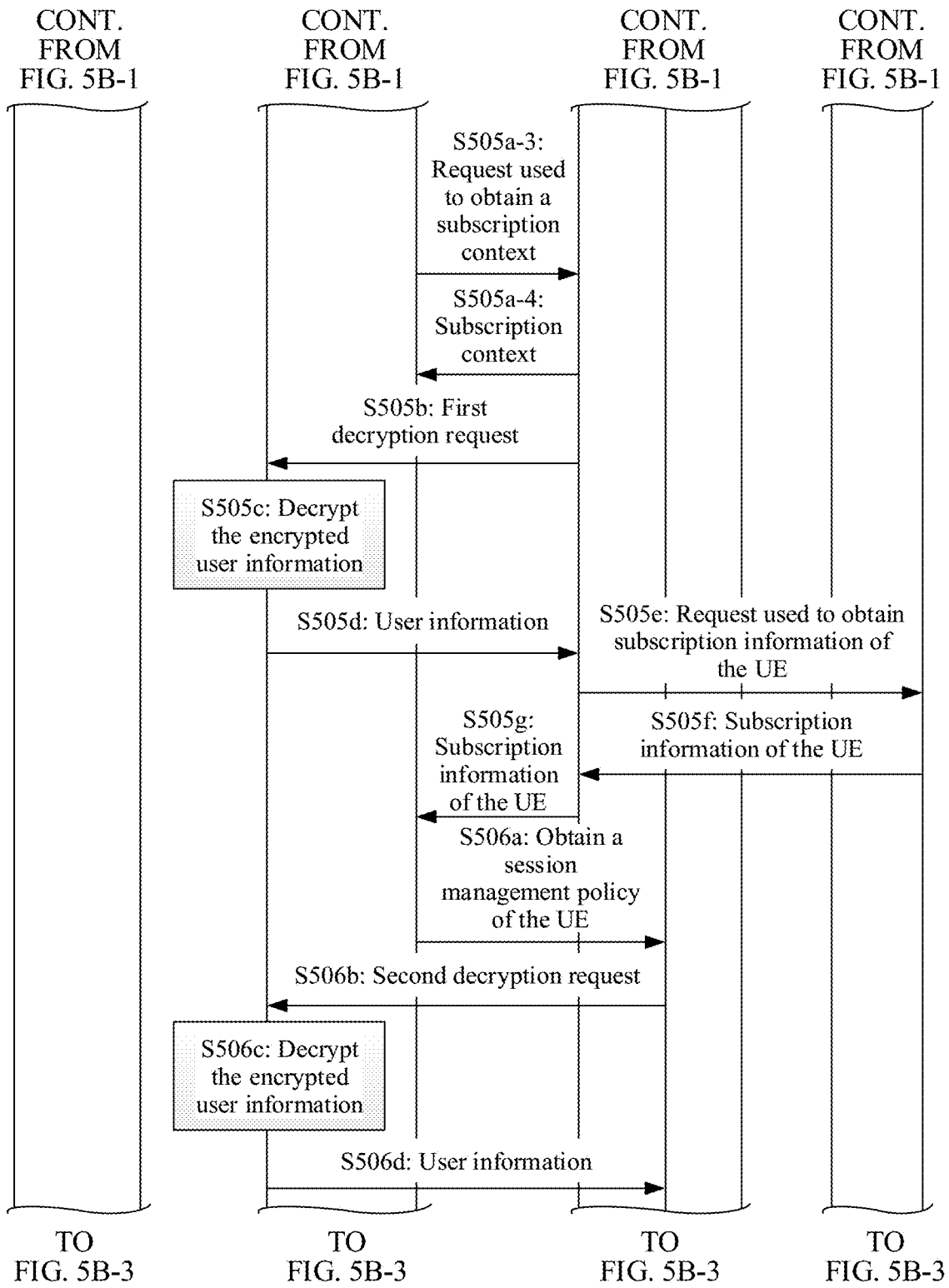
Figures 3, 5B:
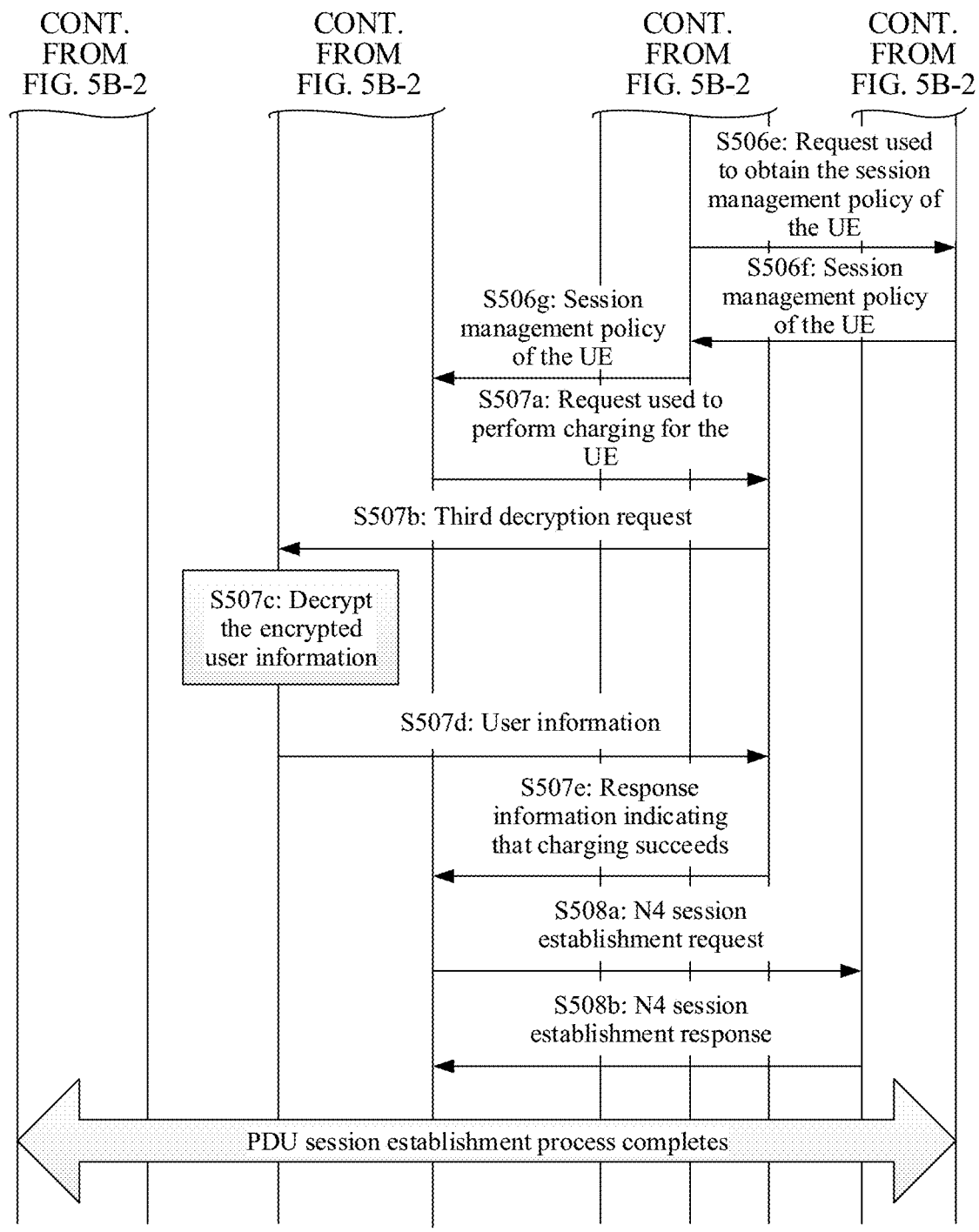

For example, the application scenario shown in FIG. 3 and a scenario in which UE establishes a PDU session are used. A UPF entity and an SMF entity are moved downstream to an edge cloud. To minimize a possibility of user information leakage, information received or sent by the UPF entity and the SMF entity is prevented from directly carrying user information of UE if possible, but carries encrypted user information. FIG. 5A is a schematic diagram of an application scenario in which the PDU session is established according to an embodiment of this application. As shown in FIG. 5A, after the UE accesses a core network through a RAN, an AMF entity may encrypt the user information of the UE, and include the encrypted user information in interaction information between the AMF entity and the SMF entity. In addition, interaction information between the SMF entity and each of a UDM entity, a PCF entity and a CHF entity also carries the encrypted user information, to prevent interaction information between NF entities from directly carrying the user information, and prevent user information leakage. The UDM entity is used as an example. Because the AMF entity may encrypt the user information, if the UDM entity needs the user information, the UDM entity may request the AMF entity to send the user information to the UDM entity. The same method also applies to the PCF entity and the CHF entity. With this method, the interaction information between the SMF entity and the UPF entity does not directly carry the user information, but carries the encrypted user information. This helps reduce a possibility of user privacy leakage.

To further describe the scenario provided in FIG. 5A in which the UE requests to establish the PDU session, refer to FIG. 5B-1, FIG. 5B-2, and FIG. 5B-3. FIG. 5B-1, FIG. 5B-2, and FIG. 5B-3 are a schematic flowchart of a communication method according to an embodiment of this application. FIG. 5B-1, FIG. 5B-2, and FIG. 5B-3 may also be understood as a schematic diagram of a process of information interaction between UE and an NF entity in a core network. As shown in FIG. 5B-1, FIG. 5B-2, and FIG. 5B-3, the process includes the following steps.

S501a to S501b: S501a: The UE sends a first PDU session establishment request to a RAN, where the first PDU session establishment request is used to request to establish a PDU session; correspondingly, the RAN receives the first PDU session establishment request sent by the UE. S501b: The RAN sends the first PDU session establishment request to an AMF entity.

Generally, before the UE accesses the core network, a registration process needs to be completed (the registration process of the UE is described in the following). After completing registration, if requesting to establish the PDU session, the UE sends the first PDU session establishment request to the AMF entity. After receiving the first PDU session establishment request sent by the UE, the AMF entity may encrypt user information of the UE, to obtain encrypted user information. It should be noted that, in the registration process of the UE, the AMF entity may obtain the user information of the UE (a specific process is described in the following). Therefore, after the UE completes the registration, when receiving the first PDU session establishment request sent by the UE, the AMF entity may encrypt the user information of the UE, to obtain the encrypted user information.

The user information of the UE may include one or more of an SUPI, an international mobile subscriber identity (International Mobile Subscriber Identity, IMSI), or a mobile station integrated services digital network number (Mobile Station Integrated Services Digital Network Number, MSISDN).

S502: The AMF entity encrypts the user information of the UE to obtain the encrypted user information.

It can be learned from the foregoing that a plurality of types of user information may be included, for example, the SUPI and the IMSI. The AMF entity may encrypt the SUPI and the IMSI through a key to obtain the encrypted user information. The key may be allocated by an operator to the AMF entity, or may be obtained by the AMF entity in another manner. This is not limited in the embodiments of this application.

S503: The AMF entity sends a second PDU session establishment request to the SMF entity, where the second PDU session establishment request is used to request to create a PDU session context, and the second PDU session establishment request carries the encrypted user information (that is, the encrypted user information obtained in S502).

S504: The SMF entity selects a UDM entity.

In actual application, the core network may include a plurality of UDM entities. Therefore, the SMF entity may select an appropriate UDM entity from the plurality of UDM entities.

In a possible implementation, the encrypted user information may carry routing information of the UDM. For example, the routing information of the UDM is a field in the encrypted user information. Therefore, the SMF entity may select an appropriate UDM entity from the plurality of UDM entities based on the routing information of the UDM. Alternatively, the encrypted user information may not carry routing information of the UDM, but the second PDU session carries the routing information of the UDM. In other words, the routing information of the UDM is not a field in the encrypted user information, but another field that is carried in the second PDU session establishment request and separated from the encrypted user information.

Certainly, the SMF entity may alternatively select the UDM entity in another manner. The foregoing implementations are merely examples. This is not limited in the embodiments of this application.

S505: The SMF entity invokes the UDM entity (that is, the UDM entity selected in S504) to obtain subscription information of the UE.

Specifically, S505 may be performed in four substeps: S505a to S505e. S505a-1: The SMF entity sends a PDU session context registration request to the UDM entity, where the PDU session context registration request is used to request to register the PDU session context, and the PDU session context registration request carries the encrypted user information. S505a-2: The UDM entity sends, to the SMF entity, response information used to indicate that the PDU session context is successfully registered. S505a-3: The SMF entity sends, to the UDM entity, a request used to obtain a subscription context. S505a-4: The UDM entity sends, to the SMF entity, the subscription context.

Because the PDU session context registration request received by the UDM entity carries the encrypted user information, and the UDM entity needs to obtain the user information of the UE before obtaining the subscription information from a UDR. Therefore, the UDM entity may request the AMF entity to decrypt the encrypted user information, to obtain the user information.

It can be learned from the foregoing that the AMF entity encrypts the user information in S502. Therefore, the AMF entity knows an encryption mode used for encrypting the user information. In this case, the UDM entity may request the AMF entity to decrypt the encrypted user information. For example, the encrypted user information obtained through encryption performed on the user information by the AMF entity may carry the routing information of the AMF entity. In this way, after receiving the PDU session context registration request, the UDM entity may determine, based on the routing information of the AMF entity carried in the encrypted information, a specific AMF entity encrypting the user information. After determining the AMF entity, the UDM entity sends a first decryption request to the AMF entity, where the first decryption request is used to request to decrypt the encrypted user information (S505b). After receiving the first decryption request, the AMF entity may decrypt the encrypted user information, to obtain the user information (S505c). The AMF entity sends the user information to the UDM entity (S505d). After obtaining the user information of the UE, the UDM entity may send, to the UDR, a request used to request the subscription information of the UE, where the request carries the user information of the UE (S505e). The UDR sends the subscription information of the UE to the UDM entity (S505f). The UDM entity sends the subscription information of the UE to the SMF entity (S505g).

S506: The SMF entity invokes the PCF entity to obtain a session management policy of the UE.

Specifically, S506 may be performed in five substeps: S506a to S506e. S506a: The SMF entity sends, to the PCF entity, a request used to obtain the session management policy of the UE, where the request carries the encrypted user information. It can be learned from the foregoing that the UDR stores the session management policy of the UE.

Therefore, the PCF entity needs to learn the user information of the UE, to obtain the session management policy of the UE from the UDR. Similar to the UDM entity, the PCF entity may request the AMF entity to decrypt the encrypted user information, to obtain the user information. To be specific, the PCF entity sends a second decryption request to the AMF entity, where the second decryption request is used to request to decrypt the encrypted user information (S506b). After receiving the second decryption request, the AMF entity may decrypt the encrypted user information, to obtain the user information (S506c). The AMF entity sends the user information to the PCF entity (S506d). After obtaining the user information of the UE, the PCF entity may send, to the UDR, the request used to obtain the session management policy of the UE, where the request carries the user information of the UE (S506e). The UDR sends the session management policy of the UE to the PCF entity (S506f). The PCF entity sends the session management policy of the UE to the SMF entity (S506g).

It should be noted that, the AMF entity has decrypted the encrypted user information once in S505c. Therefore, the AMF entity may store the user information after S505c. After receiving the second decryption request, the AMF entity may not perform S506c but directly send the stored user information to the PCF entity.

S507: The SMF entity invokes the CHF entity to perform charging for the UE.

Specifically, S507 may be performed in five substeps: S507a to S507e. S507a: The SMF entity sends, to the CHF entity, a request used to request to perform charging for the UE, where the request carries the encrypted user information. The request that is received by the CHF entity and that is used to request to perform charging for the UE carries the encrypted user information. Therefore, when the CHF entity needs to obtain the user information of the UE, similar to the UDM entity, the CHF entity may request the AMF entity to decrypt the encrypted user information. To be specific, the CHF entity sends a third decryption request to the AMF entity, where the third decryption request is used to request to decrypt the encrypted user information (S507b). After receiving the third decryption request, the AMF entity may decrypt the encrypted user information, to obtain the user information (S507c). The AMF entity sends the user information to the CHF entity (S507d). After obtaining the user information, the CHF entity may obtain the session management policy of the UE from the UDR entity. For example, the session management policy is information about a package subscribed by the UE. The CHF entity may perform charging for the UE based on the package information. S507e: The PCF entity sends, to the SMF entity, response information used to indicate that charging succeeds.

It should be noted that, the AMF entity has decrypted the encrypted user information once in S505c. Therefore, the AMF entity may store the user information after S505c. When receiving the third decryption request, the AMF entity may not perform S507c but directly sends the stored user information to the CHF entity.

S508: The SMF entity invokes the UPF entity to complete N4 session establishment (the UPF entity is connected to the SMF entity through an N4 interface).

Specifically, S508 may be performed in two substeps: S508a and S508b. S508a: The SMF entity sends an N4 session establishment request to the UPF entity, where the N4 session establishment request is used to request to establish the PDU session. S508b: The SMF entity receives an N4 session establishment response sent by the UPF entity, where the N4 session establishment response is used to indicate that the PDU session is successfully established.

It can be learned from the foregoing that in the embodiments shown in FIG. 5A, FIG. 5B-1, FIG. 5B-2, and FIG. 5B-3, the AMF entity may encrypt the user information. When one of the UDM entity, the PCF entity, and the CHF entity needs to decrypt the user information, the AMF may be requested to decrypt the encrypted user information, and send a decryption result to the one entity. In this embodiment, information received or sent by the SMF entity and the UPF entity does not directly carry the user information, but carries the encrypted user information. Therefore, for the UPF entity and the SMF entity that are moved downstream to the edge cloud, this helps prevent user information leakage. The following describes another embodiment. In this embodiment, an AMF entity may encrypt user information. When a UDM entity, a PCF entity, or a CHF entity needs decrypted user information, the UDM entity, the PCF entity, or the CHF entity may decrypt encrypted user information to obtain the user information.

Figure 6A:
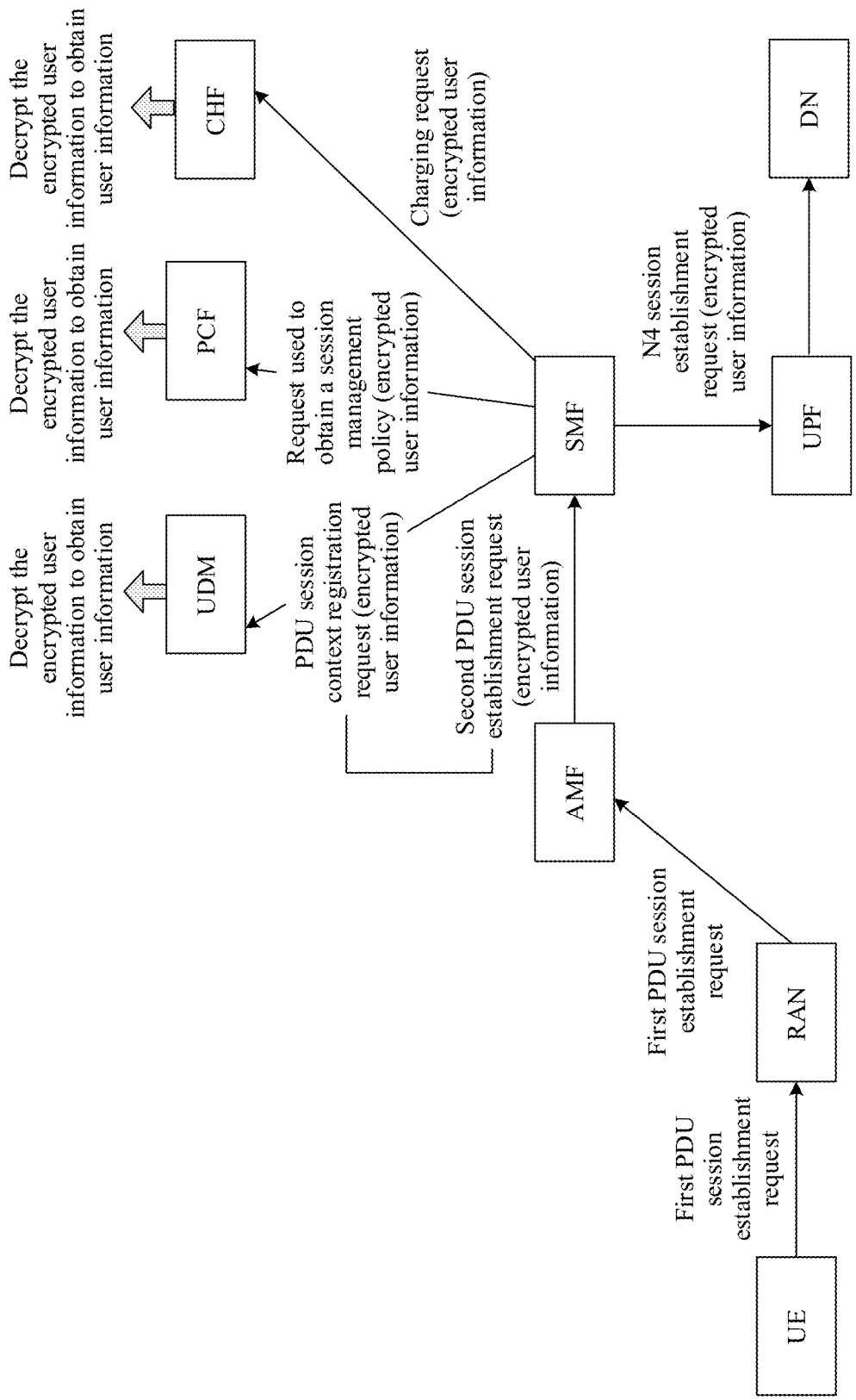
FIG. 6A is a schematic diagram of an application scenario in which a PDU session is established according to an embodiment of this application.
Figures 1, 6B:
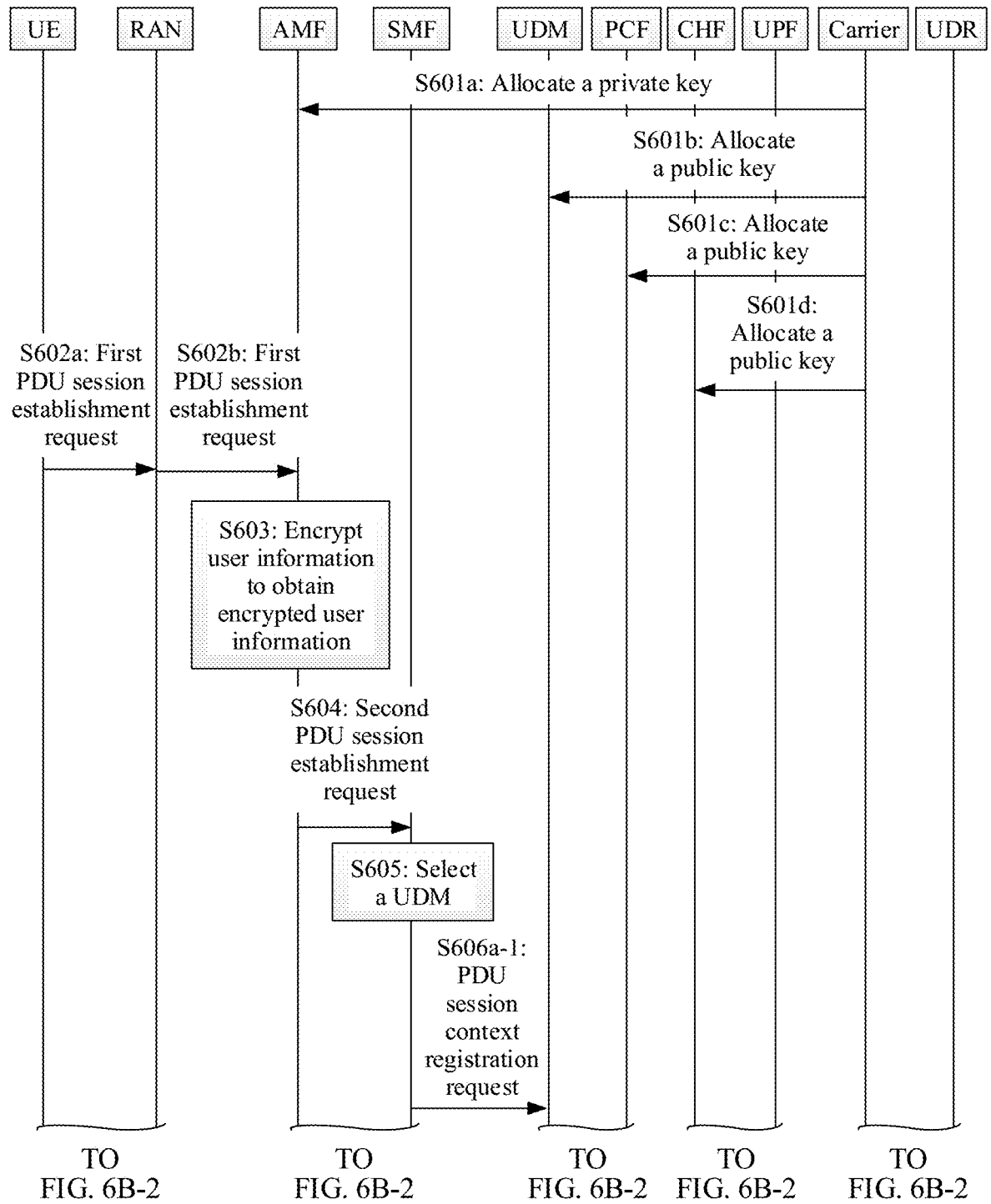
Figures 2, 6B:
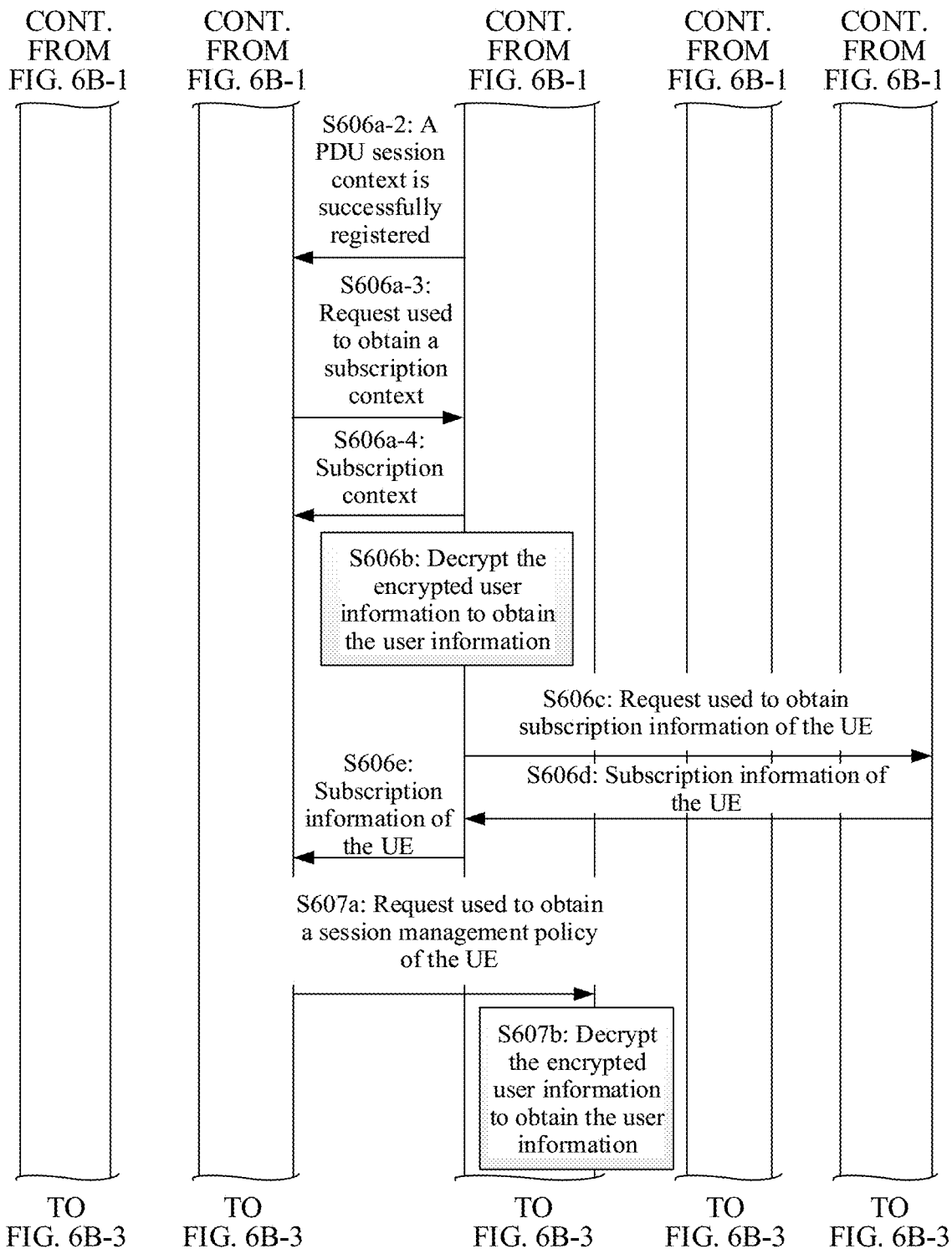
Figures 3, 6B:
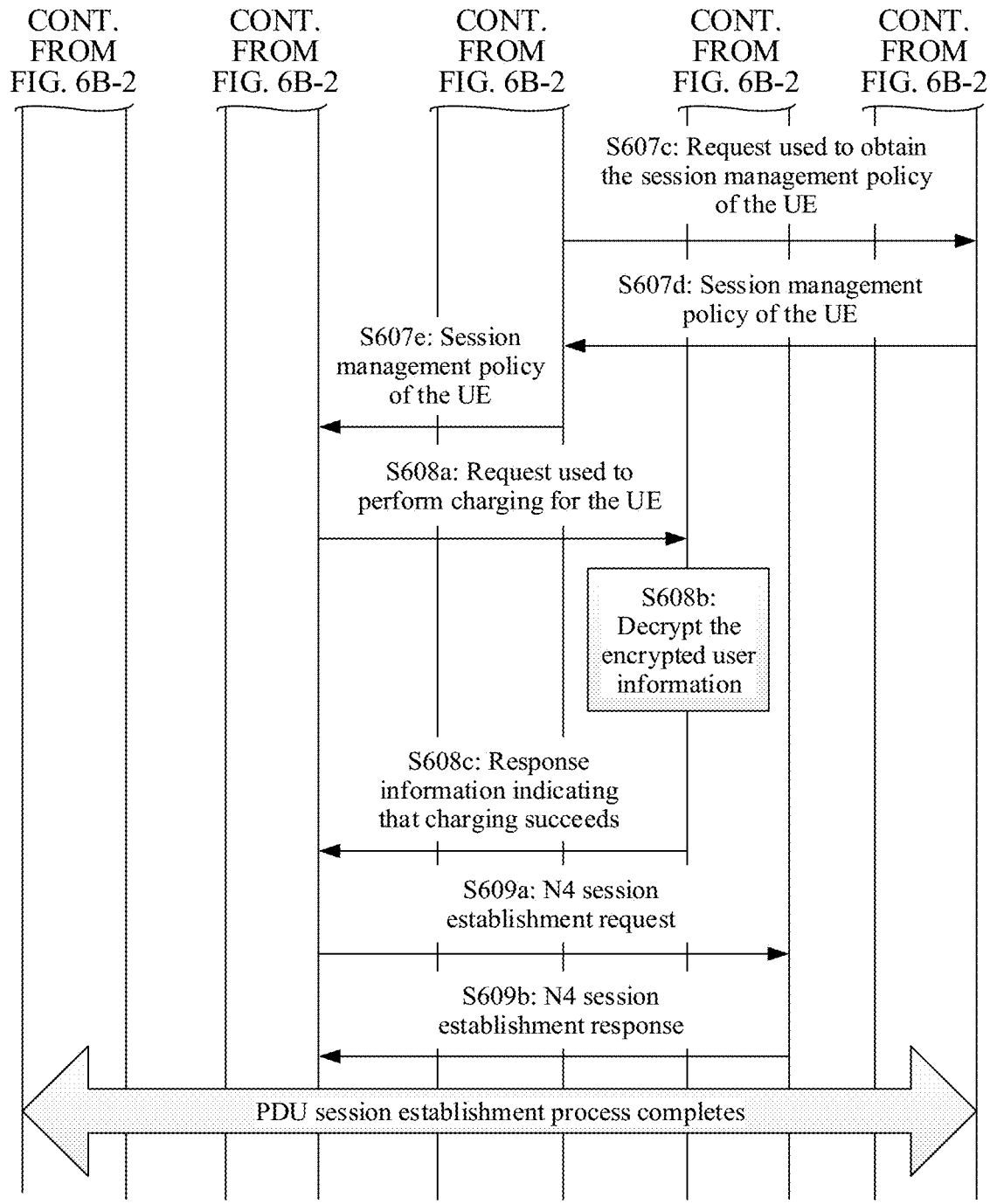

An application scenario shown in FIG. 3 is again used as an example, and a scenario in which UE establishes a PDU session is used as an example. FIG. 6A is a schematic diagram of an application scenario for the UE establishing the PDU session according to an embodiment of this application. In FIG. 6A, an operator allocates keys to the AMF entity, the UDM entity, the PCF entity, and the CHF entity. After the UE accesses a core network through a RAN, the AMF entity may encrypt the user information. Then, interaction information between the AMF entity and an SMF entity carries the encrypted user information. In addition, interaction information between the SMF entity and each of the UDM entity, the PCF entity and the CHF entity also carry the encrypted user information. This prevents interaction information between NF entities from directly carrying the user information, to prevent user information leakage. Keys are stored in the UDM entity, the PCF entity, and the CHF entity. If the UDM entity, the PCF entity, or the CHF entity needs the user information, the UDM entity, the PCF entity, or the CHF entity may decrypt the encrypted user information to obtain the user information. In this manner, interaction information between the SMF entity and a UPF entity does not directly carry the user information, but carries the encrypted user information. This helps reduce a possibility of user privacy leakage.

FIG. 6B-1, FIG. 6B-2, and FIG. 6B-3 are a schematic flowchart of a communication method according to an embodiment of this application. In FIG. 6B-1, FIG. 6B-2, and FIG. 6B-3, a scenario in which the UE requests to establish a PDU session shown in FIG. 6A is used as an example to describe a process of information interaction between the UE and an entity on a core network. As shown in FIG. 6B-1, FIG. 6B-2, and FIG. 6B-3, the process includes the following steps.

S601: An operator allocates keys to the AMF entity, the UDM entity, the PCF entity, and the CHF entity.

In this embodiment of this application, various keys may be included, for example, a symmetric key or an asymmetric key. In FIG. 6B-1, FIG. 6B-2, and FIG. 6B-3, the asymmetric key is used as an example. Specifically, S601 may be performed in four substeps: S601a to S601d. S601a: The operator allocates a private key to the AMF entity. S601b to S601d: The operator may allocate public keys to the UDM entity, the PCF entity, and the CHF entity respectively. In other words, the AMF entity encrypts the user information with the private key, and the UDM entity, the PCF entity, and the CHF entity each decrypt the encrypted user information with the public key, to obtain the user information. It should be noted that an execution sequence of S601a to S601d is not limited in the embodiments of this application.

Optionally, S601 may be performed periodically, or may be performed only once. (For example, the operator allocates keys to the AMF entity, the UDM entity, the PCF entity, and the CHF entity when the AMF entity, the UDM entity, the PCF entity, and the CHF entity are used for the first time. Then, the entities may use the keys when being used subsequently.) If S601 is performed periodically, execution cycles of S601a to S601d may be the same or different.

Optionally, in the embodiment shown in FIG. 6B-1, FIG. 6B-2, and FIG. 6B-3, that the operator allocates keys to the AMF entity, the UDM entity, the PCF entity, and the CHF entity respectively is only used as an example. In actual application, there may be another key allocation manner (another manner of allocating a key to the NF entity is subsequently described).

S602a to S602b: S602a: The UE sends a first PDU session establishment request to the RAN; correspondingly, the RAN receives the first PDU session establishment request sent by the UE, where the first PDU session establishment request carries the user information. S602b: The RAN sends the first PDU session establishment request to the AMF entity.

S603: The AMF entity encrypts the user information through the key to obtain the encrypted user information.

S604: The AMF entity sends a second PDU session establishment request to the SMF entity, where the second PDU session establishment request is used to request to create a PDU session context, and the second PDU session establishment request carries the encrypted user information (that is, the encrypted user information obtained in S603).

S605: The SMF entity selects a UDM entity.

For a process of S602a to S606, refer to the descriptions of S501a to S505 in the embodiment shown in FIG. 5B-1, FIG. 5B-2, and FIG. 5B-3. For brevity of the specification, details are not described herein again.

S606: The SMF entity invokes the UDM entity (that is, the UDM entity selected in S605) to obtain subscription information of the UE.

Specifically, S606 may be performed in three substeps: S606a to S606c. S606a-1: The SMF entity sends a PDU session context registration request to the UDM entity, where the PDU session context registration request is used to request to register a PDU session context and the PDU session context registration request carries the encrypted user information. S606a-2: The UDM entity sends, to the SMF entity, response information used to indicate that the PDU session context is successfully registered. S606a-3: The SMF entity sends, to the UDM entity, a request used to obtain a subscription context. S606a-4: The UDM entity sends, to the SMF entity, the subscription context.

It can be learned from the foregoing that the UDM entity needs to obtain the user information of the UE to obtain the subscription information of the UE. However, the operator has allocated the public key to the UDM entity. Therefore, the UDM entity may decrypt the encrypted user information through the public key to obtain the user information (S606b). After obtaining the user information of the UE, the UDM entity may send, to a UDR, a request used to request the subscription information of the UE, where the request carries the user information of the UE (S606c). The UDR sends the subscription information of the UE to the UDM entity (S606d). The UDM entity sends the subscription information of the UE to the SMF entity (S606e).

S607: The SMF entity invokes the PCF entity to obtain a session management policy of the UE.

Specifically, S607 may be performed in three substeps: S607a to S607c. S607a: The SMF entity sends, to the PCF entity, a request used to obtain the session management policy of the UE, where the request carries the encrypted user information. Because the PCF entity needs to obtain the user information of the UE to determine the session management policy of the UE, and the operator has allocated the public key to the PCF entity. Therefore, the PCF entity may decrypt the encrypted user information through the public key to obtain the user information (S607b). After obtaining the user information of the UE, the PCF entity may send, to the UDR, the request used to request the session management policy of the UE, where the request carries the user information of the UE (S607c). The UDR sends the session management policy of the UE to the PCF entity (S607d). The PCF entity sends the session management policy of the UE to the SMF entity (S607e). S607c: The PCF entity sends the session management policy of the UE to the SMF entity.

S608: The SMF entity invokes the CHF entity to perform charging for the UE.

Specifically, S608 may be performed in three substeps: S608a to S608c. S608a: The SMF entity sends, to the CHF entity, a request used to request to perform charging for the UE, where the request carries the encrypted user information. When the CHF entity needs to obtain the user information of the UE, the CHF entity may decrypt the encrypted user information through the public key allocated by the operator, to obtain the user information (S608b). S608c: The CHF entity sends, to the SMF entity, response information used to indicate that charging succeeds.

S609: The SMF entity invokes the UPF entity to complete N4 session establishment.

Specifically, S609 may be performed in two substeps: S609a and S609b. S609a: The SMF entity sends an N4 session establishment request to the UPF entity, where the N4 session establishment request is used to request to establish a PDU session. S609b: The SMF entity receives an N4 session establishment response sent by the UPF entity, where the N4 session establishment response is used to indicate that the PDU session is successfully established.

It can be learned from the foregoing that, in the embodiments shown in FIG. 6A, FIG. 6B-1, FIG. 6B-2, and FIG. 6B-3, the AMF entity may encrypt the user information. When the UDM entity, the PCF entity, or the CHF entity needs decrypted user information, the UDM entity, the PCF entity, or the CHF entity may decrypt the encrypted user information to obtain the user information. The following describes another embodiment. In this embodiment, an AMF entity may encrypt user information, and a UDM entity may decrypt encrypted user information. A PCF entity or a CHF entity may request the UDM entity to decrypt the encrypted user information, and send a decryption result to the PCF entity or the CHF entity.

Figure 7A:
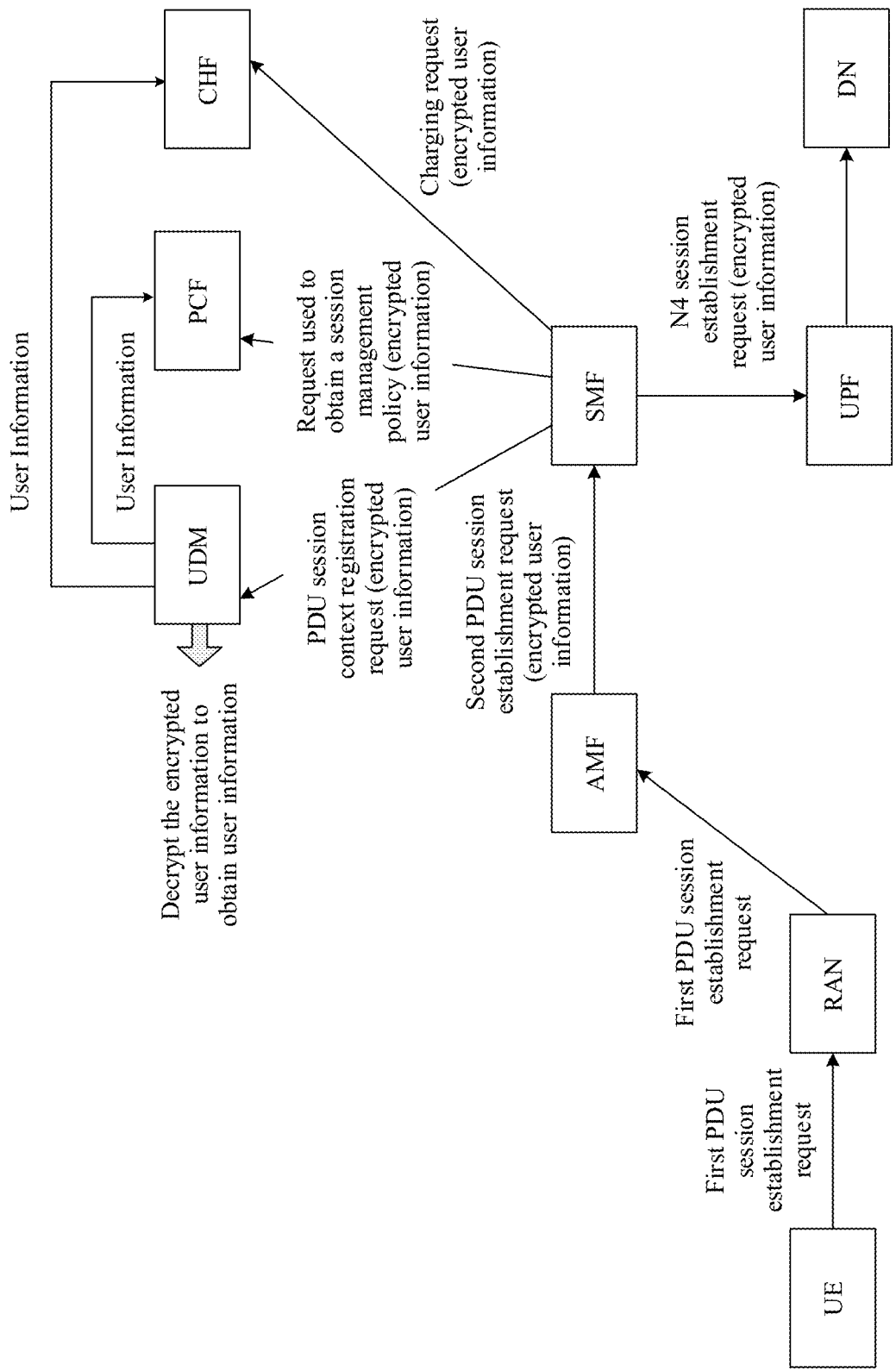
FIG. 7A is a schematic diagram of an application scenario in which a PDU session is established according to an embodiment of this application.
Figures 1, 7B:
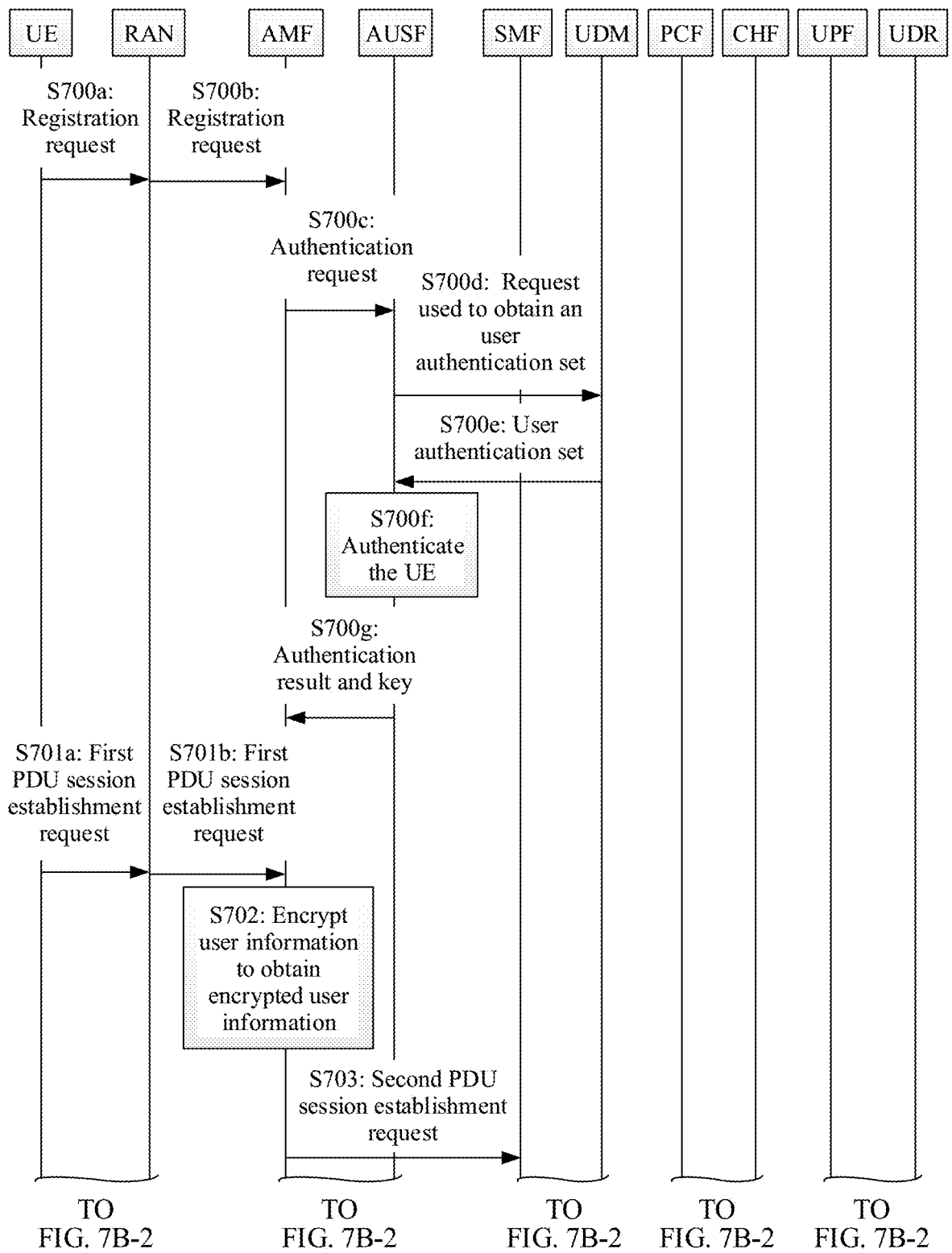
Figures 2, 7B:
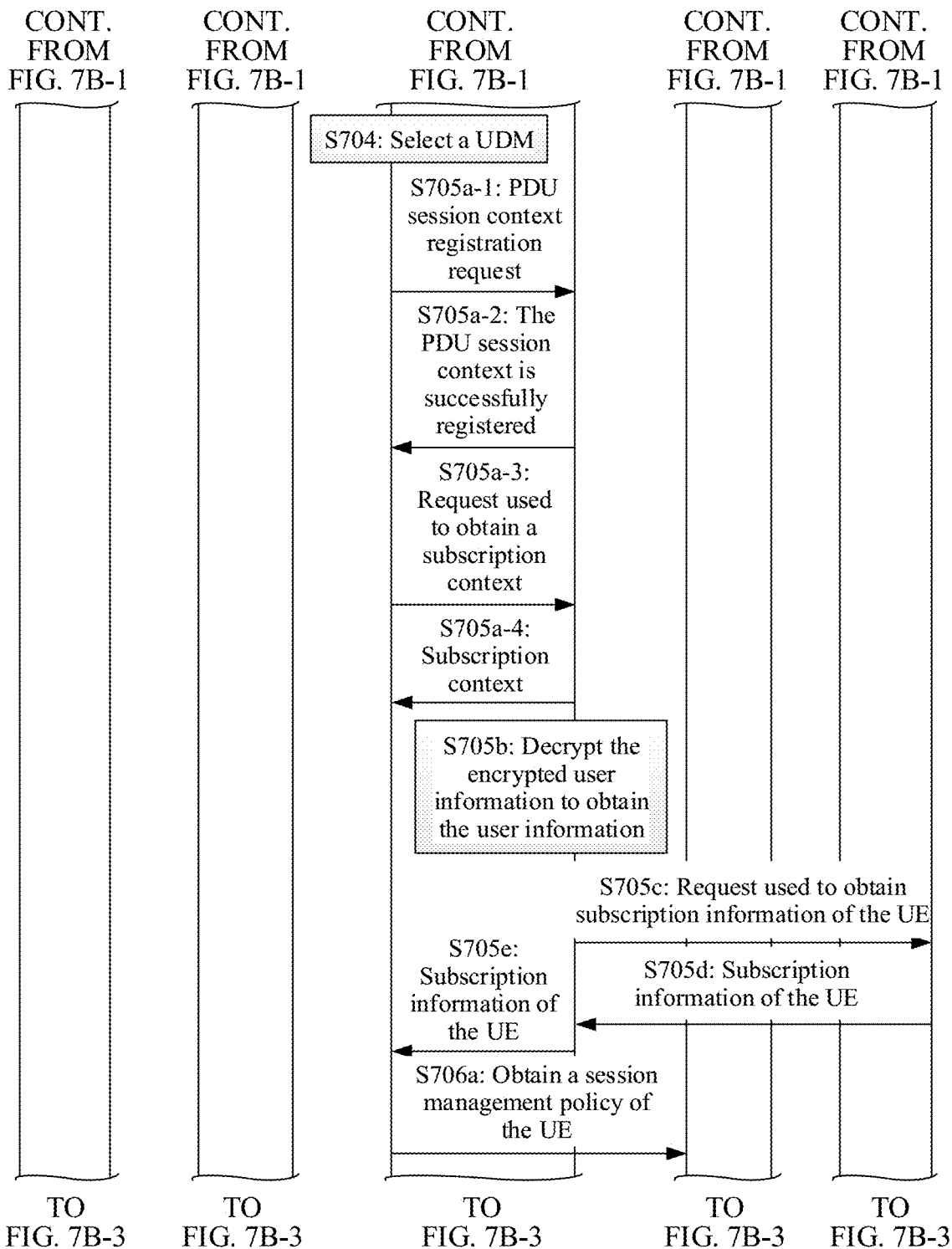
Figures 3, 7B:
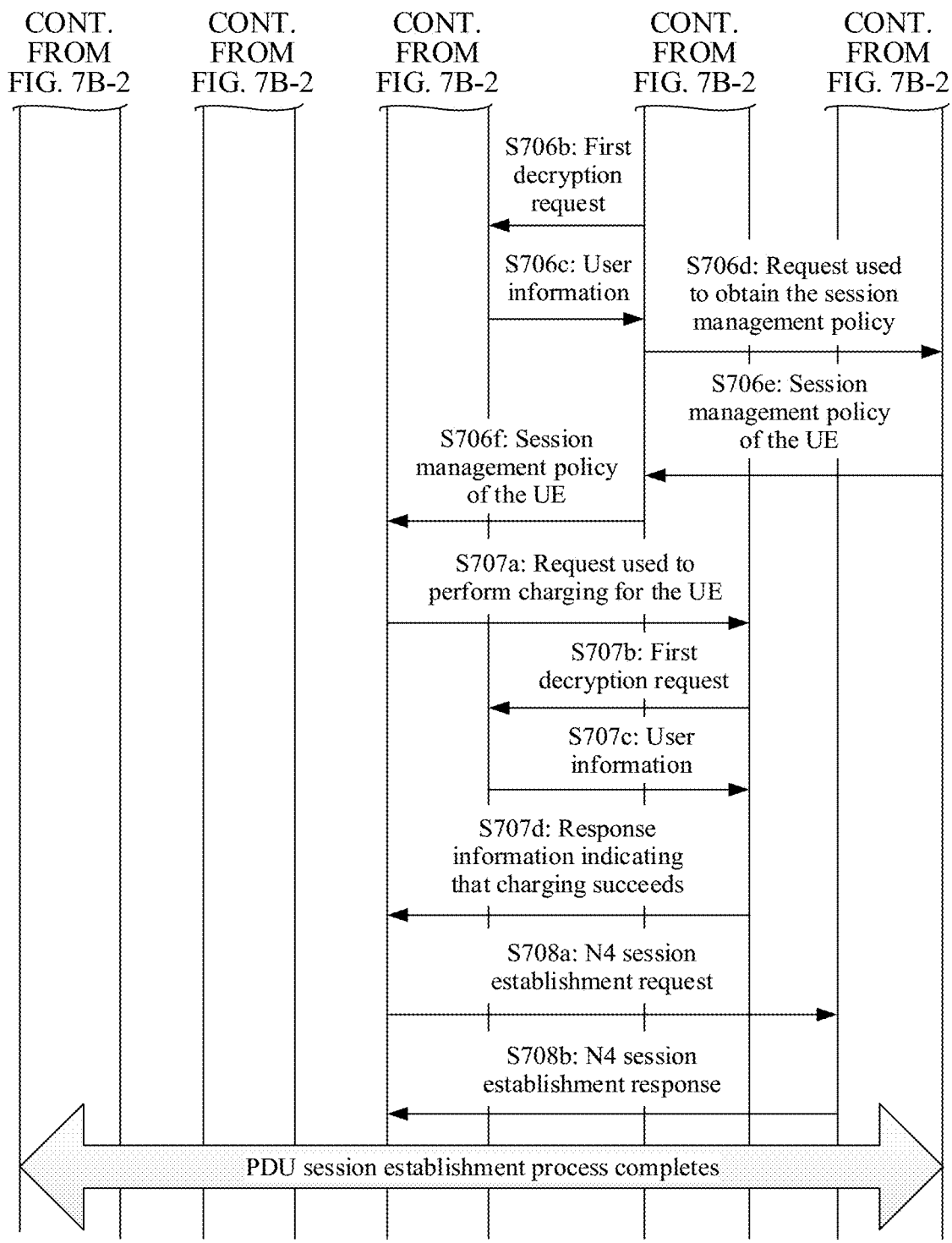

An application scenario shown in FIG. 3 is again used as an example, and a scenario in which UE establishes a PDU session is used as an example. FIG. 7A is a schematic diagram of an application scenario in which a PDU session is established by UE according to an embodiment of this application. After the UE accesses a core network through a RAN, the AMF entity may encrypt the user information, and may include the encrypted user information in interaction information between the AMF entity and an SMF entity. In addition, interaction information between the SMF entity and each of a UDM entity, a PCF entity and a CHF entity also carries the encrypted user information. This prevents interaction information between NF entities directly carrying the user information, to prevent user information leakage. Because the UDM entity stores a key, the UDM entity may decrypt the encrypted user information, to obtain the user information. The PCF entity or the CHF entity may request the UDM entity to decrypt the encrypted user information, and sent a decryption result to the PCF entity or the CHF entity. In this manner, interaction information between the SMF entity and a UPF entity does not directly carry the user information, but carries the encrypted user information. This helps reduce a possibility of user privacy leakage.

FIG. 7B-1, FIG. 7B-2, and FIG. 7B-3 are a flowchart of a communication method according to an embodiment of this application. In FIG. 7B-1, FIG. 7B-2, and FIG. 7B-3, a scenario in which the UE requests to establish a PDU session shown in FIG. 7A is used as an example to describe a process of information interaction between the UE and an entity on the core network. As shown in FIG. 7B-1, FIG. 7B-2, and FIG. 7B-3, the process includes the following steps.

S700: The UE performs a registration process.

It should be noted that, before the UE establishes data transmission with the core network, the UE may register with the core network. Therefore, the core network needs to verify validity of the UE in the registration process of the UE. If the core network verifies that the UE is valid, the registration of the UE is successful.

Specifically, S700 may be performed in six substeps: S700a and S700g. S700a: The UE sends a registration request to the RAN, where the registration request is used to request to register with the core network, and the registration request carries a SUCI. S700b: The RAN sends the registration request to the AMF entity. S700c: The AMF entity sends an authentication request to an AUSF entity, where the authentication request carries the SUCI. S700d: The AUSF entity sends, to the UDM entity, a request used to request a user authentication set, where the user authentication set includes a parameter used to verify whether the UE is a valid user. For example, the user authentication set may be authentication parameters allocated by an operator to the UE and the UDM respectively. S700e: The UDM entity sends the user authentication set to the AUSF entity. S700f: The AUSF entity performs authentication on the UE through the user authentication set, to obtain an authentication result. S700g: The AUSF entity sends the authentication result to the AMF entity. It should be noted that, in this process, when the authentication result obtained by the AUSF indicates that the UE is a legal user, the AUSF entity may allocate a key to the AMF. Certainly, the UE may also perform authentication on the core network in this process. A method in which the UE performs authentication on the core network may be performed in a manner provided in the prior art. For brevity of the specification, details are not described herein.

It can be learned from the foregoing that, in this embodiment, the UDM entity may decrypt the encrypted user, and therefore the UDM entity has the key. For example, in S700, in the registration process of the UE, the AUSF entity allocates the key to the AMF entity. Therefore, the AUSF may also allocate a key (not shown in FIG. 7B-1, FIG. 7B-2, and FIG. 7B-3) to the UDM entity, or the operator may allocate a key to the UDM entity (not shown in FIG. 7B-1, FIG. 7B-2, and FIG. 7B-3). Alternatively, in S700, the AUSF entity does not allocate the key to the AMF entity, but the operator allocates keys to the AMF entity and the UDM entity. Certainly, there may be another method to allocate the key. This is not limited in the embodiments of this application.

S701a to S701b: S701a: The UE sends a first PDU session establishment request to the RAN; correspondingly, the RAN receives the first PDU session establishment request sent by the UE, where the first PDU session establishment request carries the user information. S701b: The RAN sends the first PDU session establishment request to the AMF entity.

S702: The AMF entity encrypts the user information of the UE to obtain the encrypted user information.

It should be noted that, it can be learned from the foregoing that user information of various types may be included. If the user information includes only an SUPI, the AMF entity may not need to perform S702 because the AMF entity has obtained the SUCI (the SUCI is obtained through encryption performed on the SUPI) of the UE in S700a to S700c in the registration process. Therefore, if the user information includes only the SUPI, the AMF entity may directly perform S703 without performing S702. To be specific, the SUCI is the encrypted user information. In other words, the second PDU session establishment request carries the SUCI.

S703: The AMF entity sends a second PDU session establishment request to the SMF entity, where the second PDU session establishment request is used to request to create a PDU session context, and the second PDU session establishment request carries the encrypted user information (that is, the encrypted user information obtained in S702).

S704: The SMF entity selects a UDM entity.

S705: The SMF entity obtains subscription information of the UE through the UDM entity (that is, the UDM entity selected in S704).

Specifically, S705 may be performed in two substeps: S705a and S705b. S705a-1: The SMF entity sends a PDU session context registration request to the UDM entity, where the PDU session context registration request is used to request to register a PDU session context and the PDU session context registration request carries the encrypted user information. S705a-2: The UDM entity sends, to the SMF entity, response information used to indicate that the PDU session context is successfully registered. S705a-3: The SMF entity sends, to the UDM entity, a request used to obtain a subscription context. S705a-4: The UDM entity sends, to the SMF entity, the subscription context.

The PDU session context registration request received by the UDM entity carries the encrypted user information, and therefore the UDM entity may decrypt the encrypted user information when needing to obtain the user information. It can be learned from the foregoing that the UDM entity stores the key, and therefore the UDM entity may decrypt the encrypted user information, to obtain the user information (S705b). After obtaining the user information of the UE, the UDM entity may send, to the UDR, a request used to request the subscription information of the UE, where the request carries the user information of the UE (S705c). The UDR sends the subscription information of the UE to the UDM entity (S705d). The UDM entity sends the subscription information of the UE to the SMF entity (S705e).

S706: The SMF entity invokes the PCF entity to obtain a session management policy of the UE.

Specifically, S706 may be performed in four substeps: S706a to S706d. S706a: The SMF entity sends, to the PCF entity, a request used to obtain the session management policy of the UE, where the request carries the encrypted user information. The request that is received by the PCF entity and that is used to obtain the session management policy of the UE carries the encrypted user information. Therefore, when the PCF entity needs to obtain the user information, the PCF entity may request the UDM entity to decrypt the encrypted user information. To be specific, the PCF entity sends a first decryption request to the UDM entity, where the first decryption request is used to request to decrypt the encrypted user information (S706b). After receiving the first decryption request, the UDM entity sends the user information to the PCF entity (S706c). After obtaining the user information of the UE, the PCF entity may send, to the UDR, a request used to request the session management policy of the UE, where the request carries the user information of the UE (S706d). The UDR sends the session management policy of the UE to the PCF entity (S706e). The PCF entity sends the session management policy of the UE to the SMF entity (S706f).

S707: The SMF entity invokes the CHF entity to perform charging for the UE.

Specifically, S707 may be performed in four substeps: S707a to S707d. S707a: The SMF entity sends, to the CHF entity, a request used to request to perform charging for the UE, where the request carries the encrypted user information. The request that is received by the CHF entity and that is used for performing charging for the UE carries the encrypted user information. Therefore, when needing to obtain the user information, similar to the PCF entity, the CHF entity may request the UDM entity to decrypt the encrypted user information. To be specific, the CHF entity sends a second decryption request to the UDM entity, where the second decryption request is used to request to decrypt the encrypted user information (S707b). After receiving the second decryption request, the UDM entity sends the user information to the CHF entity (S707c). After obtaining the user information, the CHF entity may obtain the session management policy of the UE from the UDR entity, for example, information about a package subscribed by the UE. The CHF entity performs charging for the UE based on the package information. S707d: The PCF entity sends, to the SMF entity, response information used to indicate that charging succeeds.

S708: The SMF entity invokes the UPF entity to complete an N4 session establishment.

Specifically, S708 may be performed in two substeps: S708a and S708b. S708a: The SMF entity sends an N4 session establishment request to the UPF entity, where the N4 session establishment request is used to request to establish a PDU session. S708b: The SMF entity receives an N4 session establishment response sent by the UPF entity, where the N4 session establishment response is used to indicate that the PDU session is successfully established.

It can be learned from the foregoing that, in the embodiments shown in FIG. 7A, FIG. 7B-1, FIG. 7B-2, and FIG. 7B-3, the AMF entity may encrypt the user information, and the UDM entity may decrypt the encrypted user information. The PCF entity or the CHF entity may request the UDM entity to: decrypt the encrypted user information and send the decryption result to the PCF entity or the CHF entity. In other embodiments, the AMF entity may encrypt the user information, and the PCF entity may decrypt the encrypted user information. The UDM entity or the CHF entity may request the PCF entity to: decrypt the encrypted user information and send a decryption result to the UDM entity or the CHF entity. In these embodiments, the AMF entity and the PCF entity each need to obtain a key. Therefore, keys may be allocated to the AMF entity and the PCF entity in the foregoing key allocation manner. For example, the operator may allocate the keys to the AMF entity and the PCF entity. In other embodiments, the AMF entity may encrypt the user information, and the CHF entity may decrypt the encrypted user information. The UDM entity or the PCF entity may request the CHF entity to: decrypt the encrypted user information and send a decryption result to the UDM entity or the PCF entity. In these embodiments, the AMF entity and the CHF entity each need to obtain a key. Therefore, keys may be allocated to the AMF entity and the CHF entity in the foregoing key allocation manner.

It should be noted that, in the embodiments shown in FIG. 5A to FIG. 7B-3, the scenario shown in FIG. 3 is used as an example for description. In other words, that the UPF entity and the SMF being moved downstream to the edge cloud is used as an example for description. In actual application, another NF entity, for example, the UDM entity or the PCF entity, may be moved downstream to the edge cloud. For example, the PCF entity is moved downstream to the edge cloud. To minimize user information leakage, the PCF entity may contact with the user information as less as possible (for example, information received or sent by the PCF entity does not carry the user information). A same idea based on the communication method shown in FIG. 5B-1, FIG. 5B-2, and FIG. 5B-3 may alternatively be used. Therefore, regardless of which NF entity is moved downstream to the edge cloud, the same idea based on the communication method shown in FIG. 5B-1, FIG. 5B-2, and FIG. 5B-3 may be used to ensure that information received or sent by the NF entity moved downstream to the edge cloud does not directly carry the user information, but carries the encrypted user information.

Implementations of this application may be randomly combined to achieve different technical effects.

The embodiment shown in FIG. 7B-1, FIG. 7B-2, and FIG. 7B-3 is used as an example. Although the AUSF entity allocates the keys to the AMF entity and the UDM entity, when the PCF entity (or the CHF entity) needs the user information, the PCF entity (or the CHF entity) may not request the UDM entity, but request the AMF entity to: decrypt the encrypted user information and send the decryption result to the PCF entity (or the CHF entity).

In the foregoing embodiments provided in this application, the method provided in the embodiments of this application is described from a perspective in which each NF entity on the core network is used as an execution body. To implement functions in the methods provided in the embodiments of this application, each NF entity may include a hardware structure and/or a software module, and implements the functions in a form of the hardware structure, the software module, or a combination of the hardware structure and the software module. Whether a function of the functions is performed by the hardware structure, the software module, or the combination of the hardware structure and the software module depends on a specific application and a design constraint condition of the technical solution.

The following describes devices provided in the embodiments of the present invention with reference to accompanying drawings.

Figure 8:
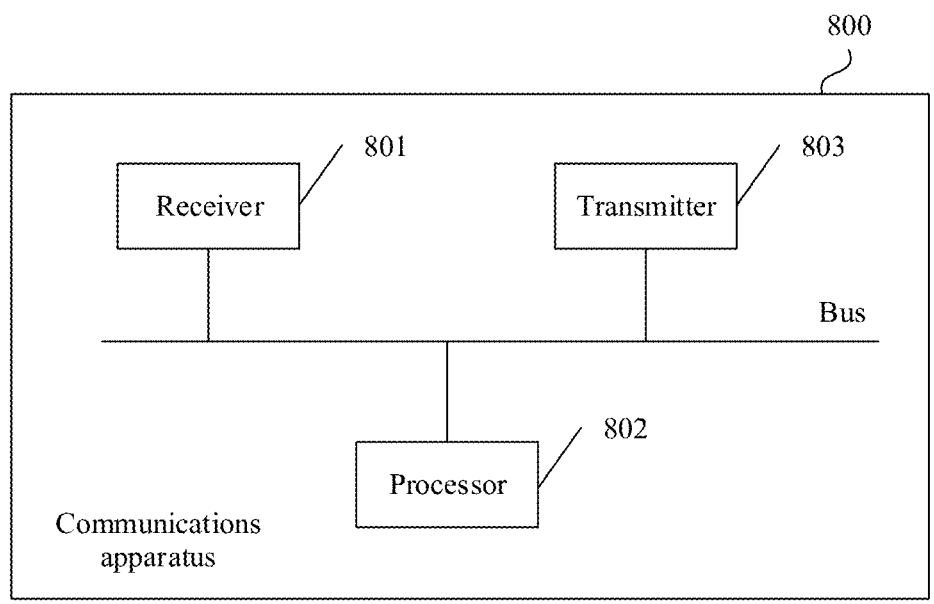
FIG. 8 is a schematic structural diagram of a communications apparatus according to an embodiment of this application.

FIG. 8 is a schematic structural diagram of a communications apparatus 800. The communications apparatus 800 may implement functions of the AMF entity described above. The communications apparatus 800 may include a receiver 801, a processor 802, and a transmitter 803. The receiver 801, the processor 802, and the transmitter 803 may be connected by a bus. Certainly, in actual application, the receiver 801, the processor 802, and the transmitter 803 may not be of a bus structure, but may be of another structure, for example, a star structure. This is not specifically limited in this application.

The receiver 801 may be configured to perform S501b, S505c, S506b, and S507b in the embodiment shown in FIG. 5B-1, FIG. 5B-2, and FIG. 5B-3, and/or configured to support another process of the technology described in this specification. Alternatively, the receiver 801 may be configured to perform S601a and S602b in the embodiment shown in FIG. 6B-1, FIG. 6B-2, and FIG. 6B-3, and/or configured to support another process of the technology described in this specification. Alternatively, the receiver 801 may be configured to perform S700b, S700g, and S701b in the embodiment shown in FIG. 7B-1, FIG. 7B-2, and FIG. 7B-3, and/or configured to support another process of the technology described in this specification.

The processor 802 may be configured to perform S502, S505c, S506c, and S507c in the embodiment shown in FIG. 5B-1, FIG. 5B-2, and FIG. 5B-3, and/or configured to support another process of the technology described in this specification; the processor 802 may be configured to perform S603 in the embodiment shown in FIG. 6B-1, FIG. 6B-2, and FIG. 6B-3, and/or configured to support another process of the technology described in this specification; or the processor 802 may be configured to perform S702 in the embodiment shown in FIG. 7B-1, FIG. 7B-2, and FIG. 7B-3, and/or configured to support another process of the technology described in this specification.

The transmitter 803 may be configured to perform S503, S505d, S506d, and S507d in the embodiment shown in FIG. 5B-1, FIG. 5B-2, and FIG. 5B-3, and/or configured to support another process of the technology described in this specification; the transmitter 803 may be configured to perform S604 in the embodiment shown in FIG. 6B-1, FIG. 6B-2, and FIG. 6B-3, and/or configured to support another process of the technology described in this specification; or the transmitter 803 may be configured to perform S700c and S703 in the embodiment shown in FIG. 7B-1, FIG. 7B-2, and FIG. 7B-3, and/or configured to support another process of the technology described in this specification.

All related content of the steps in the foregoing method embodiment may be cited in function descriptions of corresponding function modules. Details are not described herein again.

Figure 9:
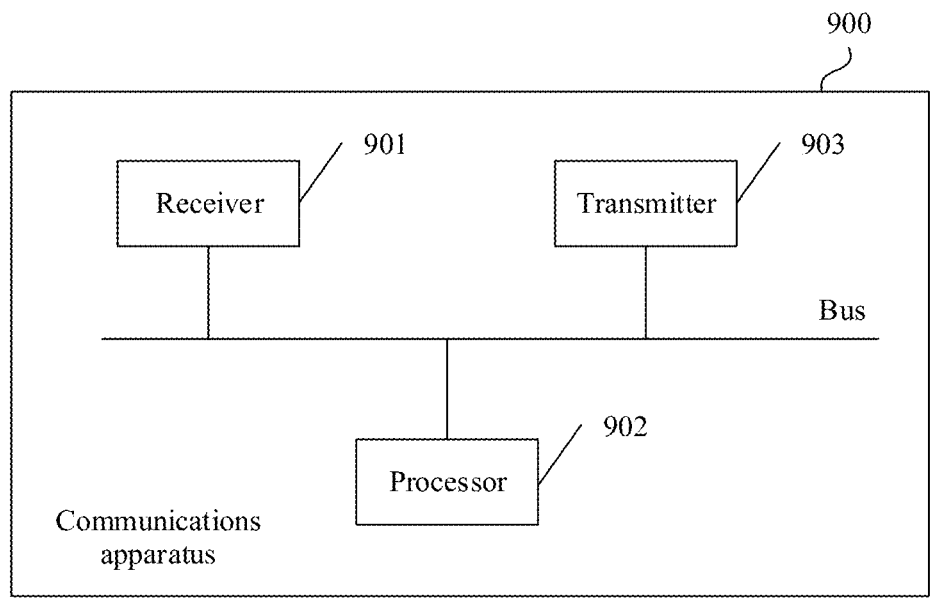
FIG. 9 is a schematic structural diagram of a communications apparatus according to an embodiment of this application.

FIG. 9 is a schematic structural diagram of a communications apparatus 900. The communications apparatus 900 may implement functions of the UDM entity described above. The communications apparatus 900 may include a receiver 901, a processor 902, and a transmitter 903. The receiver 901, the processor 902, and the transmitter 903 may be connected by a bus. Certainly, in actual application, the receiver 901, the processor 902, and the transmitter 903 may not be of a bus structure, but may be of another structure, for example, a star structure. This is not specifically limited in this application.

The receiver 901 may be configured to perform S505a-1, S505a-3, S505d, and S505f in the embodiment shown in FIG. 5B-1, FIG. 5B-2, and FIG. 5B-3, and/or configured to support another process of the technology described in this specification; the receiver 901 may be configured to perform S601b, S606a-1, S606a-3, and S606d in the embodiment shown in FIG. 6B-1, FIG. 6B-2, and FIG. 6B-3, and/or another process used to support the technology described in this specification; or the receiver 901 may be configured to perform S700d, S705a-1, S705a-3, and S705d in the embodiment shown in FIG. 7B-1, FIG. 7B-2, and FIG. 7B-3, and/or another process used to support the technology described in this specification.

The processor 902 may be configured to perform S606*b* in the embodiment shown in FIG. 6B-1, FIG. 6B-2, and FIG. 6B-3, and/or configured to support another process of the technology described in this specification; or the processor 902 may be configured to perform S705*b* in the embodiment shown in FIG. 7B-1, FIG. 7B-2, and FIG. 7B-3, and/or configured to support another process of the technology described in this specification.

The transmitter 903 may be configured to perform S505*a*-2, S505*a*-4, S505*b*, S505*b* and S505*g* in the embodiment shown in FIG. 5B-1, FIG. 5B-2, and FIG. 5B-3, and/or configured to support another process of the technology described in this specification; the transmitter 903 may be configured to perform S606*a*-2, S606*a*-4, S606*c*, and S606*e* in the embodiment shown in FIG. 6B-1, FIG. 6B-2, and FIG. 6B-3, and/or configured to support another process of the technology described in this specification; or the transmitter 903 may be configured to perform S700*e*, S705*a*-2, S705*a*-4, S705*c* and S705*e* in the embodiment shown in FIG. 7B-1, FIG. 7B-2, and FIG. 7B-3, and/or configured to support another process of the technology described in this specification.

All related content of the steps in the foregoing method embodiment may be cited in function descriptions of corresponding function modules. Details are not described herein again.

Optionally, a processor in the communications apparatus shown each of FIG. 8 and FIG. 9 may be specifically a general central processing unit, an application specific integrated circuit (ASIC), one or more integrated circuits that are used to control program execution, a hardware circuit developed by using a field programmable gate array (FPGA), or a baseband processor.

Optionally, the processor may include at least one processing core.

Optionally, the transmitter and the receiver may be independent of each other or may be integrated together physically.

The transmitter and the receiver may be radio frequency circuits. Alternatively, the transmitter is a send port, and the receiver is a receive port.

Optionally, the communications apparatus shown in FIG. 8 or FIG. 9 may further include a memory. The memory may include one or more of a read-only memory (ROM), a random access memory (RAM), and a magnetic disk storage. The memory may be configured to store data and/or an instruction required for running the processor. There may be one or more memories.

The embodiments of this application further provide a computer storage medium. The storage medium may include a memory, the memory may store a program, and when the program is executed, all steps performed by the AMF described in the method embodiments shown in FIG. 5B-1, FIG. 5B-2, FIG. 5B-3, FIG. 6B-1, FIG. 6B-2, FIG. 6B-3, FIG. 7B-1, FIG. 7B-2, and FIG. 7B-3 are performed.

The embodiments of this application further provide a computer storage medium. The storage medium may include a memory, the memory may store a program, and when the program is executed, all steps performed by the UDM described in the method embodiments shown in FIG. 5B-1, FIG. 5B-2, FIG. 5B-3, FIG. 6B-1, FIG. 6B-2, FIG. 6B-3, FIG. 7B-1, FIG. 7B-2 and FIG. 7B-3 are performed.

The embodiments of the present invention further provide a computer program product. When the computer program product runs on an AMF, the AMF is enabled to perform all or some of the steps performed by the AMF that are described in the method embodiments shown in FIG. 5B-1, FIG. 5B-2, FIG. 5B-3, FIG. 6B-1, FIG. 6B-2, FIG. 6B-3, FIG. 7B-1, FIG. 7B-2 and FIG. 7B-3.

The embodiments of the present invention further provide a computer program product. When the computer program product runs on a UDM, the UDM is enabled to perform all or some of the steps performed by the UDM that are described in the method embodiments shown in FIG. 5B-1, FIG. 5B-2, FIG. 5B-3, FIG. 6B-1, FIG. 6B-2, FIG. 6B-3, FIG. 7B-1, FIG. 7B-2 and FIG. 7B-3.

A person skilled in the art should understand that the embodiments of the present invention may be provided as a method, a system, or a computer program product. Therefore, the embodiments of the present invention may use a form of hardware only embodiments, software only embodiments, or embodiments with a combination of software and hardware. Moreover, the embodiments of the present invention may use a form of a computer program product that is implemented on one or more computer-usable storage media (including but not limited to a magnetic disk memory, a CD-ROM, an optical memory, and the like) that include computer-usable program code.

The embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements the specific function in the one or more processes in the flowcharts and/or in the one or more blocks in the block diagrams.

These computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide steps for implementing the specific function in the one or more processes in the flowcharts and/or in the one or more blocks in the block diagrams.

Apparently, a person skilled in the art may make various modifications and variations to the embodiments of the present invention without departing from the spirit and scope of this application. This application is intended to cover these modifications and variations to the embodiments of the present invention provided that they fall within the scope defined by the following claims of this application and their equivalent technologies.

What is claimed is:

1. A communication method, comprising:
receiving, by an access control and mobility management function (AMF) entity, a first protocol data unit (PDU) session establishment request sent by a user equipment (UE), wherein the first PDU session establishment request is used to request to establish a PDU session;
encrypting, by the AMF entity, user information of the UE to obtain encrypted user information; and
sending, by the AMF entity, a second PDU session establishment request to a session management function (SMF) entity, wherein the second PDU session establishment request carries the encrypted user information.

2. The method according to claim 1, wherein the method further comprises:
receiving, by the AMF entity, a first decryption request sent by a user data management (UDM) entity, wherein the first decryption request carries the encrypted user information;
decrypting, by the AMF entity, the encrypted user information to obtain the user information; and
sending, by the AMF entity, the user information to the UDM entity.

3. The method according to claim 1, wherein the method further comprises:
receiving, by the AMF entity, a second decryption request sent by a policy control function (PCF) entity, wherein the second decryption request carries the encrypted user information;
decrypting, by the AMF entity, the encrypted user information to obtain the user information; and
sending, by the AMF entity, the user information to the PCF entity.

4. The method according to claim 1, wherein the method further comprises:
receiving, by the AMF entity, a third decryption request sent by a charging function (CHF) entity, wherein the third decryption request carries the encrypted user information;
decrypting, by the AMF entity, the encrypted user information to obtain the encrypted user information; and
sending, by the AMF entity, the user information to the CHF entity.

5. A communications apparatus, comprising:
a receiver, configured to receive a first protocol data unit (PDU) session establishment request sent by a user equipment (UE), wherein the first PDU session establishment request is used to request to establish a PDU session;
a processor, configured to encrypt user information of the UE to obtain encrypted user information; and
a transmitter, configured to send a second PDU session establishment request to a session management function (SMF) entity, wherein the second PDU session establishment request carries the encrypted user information.

6. The apparatus according to claim 5, wherein the receiver is further configured to receive a first decryption request sent by a user data management (UDM) entity, and the first decryption request carries the encrypted user information;
the processor is further configured to decrypt the encrypted user information to obtain the user information; and
the transmitter is further configured to send the user information to the UDM entity.

7. The apparatus according to claim 5, wherein the receiver is further configured to receive a second decryption request sent by a policy control function (PCF) entity, and the second decryption request carries the encrypted user information;
the processor is further configured to decrypt the encrypted user information to obtain the user information; and
the transmitter is further configured to send the user information to the PCF entity.

8. The apparatus according to claim 5, wherein the receiver is further configured to receive a third decryption request sent by a charging function (CHF) entity, and the third decryption request carries the encrypted user information;
the processor is further configured to decrypt the encrypted user information to obtain the encrypted user information; and
the transmitter is further configured to send the user information to the CHF entity.

* * * * *